(12) United States Patent
Romanovsky

(10) Patent No.: US 6,614,574 B2
(45) Date of Patent: Sep. 2, 2003

(54) TOTAL INTERNAL REFLECTION LIGHT MODULATING MICROSTRUCTURE DEVICES

(75) Inventor: Alexander B. Romanovsky, San Jose, CA (US)

(73) Assignee: Teloptics Corporation, San Francisco, CA (US)

( * ) Notice: Subject to any disclaimer, the term of this patent is extended or adjusted under 35 U.S.C. 154(b) by 0 days.

(21) Appl. No.: 10/135,127

(22) Filed: Apr. 29, 2002

(65) Prior Publication Data

US 2002/0118433 A1 Aug. 29, 2002

Related U.S. Application Data

(63) Continuation of application No. 09/434,085, filed on Nov. 5, 1999, now Pat. No. 6,381,060, which is a continuation-in-part of application No. 08/959,778, filed on Oct. 29, 1997, now Pat. No. 6,310,712.

(51) Int. Cl.[7] .............................. G02F 1/03; G02F 1/29; G02F 1/00; G02F 1/295
(52) U.S. Cl. ........................ 359/247; 359/245; 359/248; 359/252; 359/254; 359/259; 359/316; 359/318; 359/322; 359/323; 385/4
(58) Field of Search .................................. 359/245, 247, 359/248, 252, 253, 251, 254, 256, 257, 259, 263, 318, 320, 322, 323, 299, 276, 316; 385/4, 141; 372/96

(56) References Cited

U.S. PATENT DOCUMENTS 3,458,247 A 7/1969 Buhrer et al. ............... 359/316

(List continued on next page.)

FOREIGN PATENT DOCUMENTS

EP 0 344 857 A1 5/1989

(List continued on next page.)

OTHER PUBLICATIONS

*Antiferroelectric–Phase PLZT For Use In High Density Optical Data Storage*, S. Mancha, J. Bullington, R. Carter and C. Dehainaut, Airforce Weapons Laboratory (AFSC) Kirtland Airforce Base New Mexico, *Ferroelectrics*, 1988 Gordon and Breach Science Publishers S.A., vol. 82, pp. 99–104.

(List continued on next page.)

*Primary Examiner*—Evelyn Lester
*Assistant Examiner*—Gary O'Neill
(74) *Attorney, Agent, or Firm*—Knobbe, Martens, Olson & Bear LLP

(57) ABSTRACT

A light modulating switch (210) including a switching element (218) having a first portion (226) of electro-optic material to which first and second electrodes (213, 224) are associated. A second portion (228) is composed of material having an index of refraction matching that of the first portion (226) when no voltage is applied to electro-optically activate the first portion (226), but the index of refraction of the second portion (228) is less than the index of refraction of the first portion (226) when the first portion (226) is electro-optically activated by application of voltage to the electrodes (213, 224). The first and second portions (226, 228) are in close conjunction with each other such that a TIR boundary (230) is formed at the junction of the first and second portions (226, 228) and the switching element (218) is oriented with respect to at least one incident light beam (240) such that the incident light beam (240) enters the first portion (226) and strikes the boundary (230) at an angle such that the light beam (240) is totally reflected internally when the first portion (226) is electro-optically activated, but which will pass unreflected through the boundary (230) when the first portion (226) is not electro-optically activated. The thickness of the second portion (228) is preferably reduced by removal of a step region (246) so that electric field lines within the active first portion (226) are more narrowly directed and the TIR boundary (230) is flatter and more regular.

18 Claims, 11 Drawing Sheets

U.S. PATENT DOCUMENTS

| | | | | |
|---|---|---|---|---|
| 3,497,286 | A | 2/1970 | Morton et al. | 359/289 |
| 3,584,223 | A | 6/1971 | Aldrich et al. | 250/216 |
| 3,873,187 | A | 3/1975 | Brooks | 359/259 |
| 3,958,862 | A | 5/1976 | Scibor-Rylski | 359/261 |
| 4,006,963 | A | 2/1977 | Baues et al. | 385/37 |
| 4,008,947 | A | 2/1977 | Baües et al. | 385/9 |
| 4,125,318 | A | 11/1978 | Scibor-Rylski | 359/317 |
| 4,181,399 | A | 1/1980 | McMahon et al. | 385/16 |
| 4,196,977 | A | 4/1980 | Scibor-Rylski et al. | 359/279 |
| 4,201,442 | A | 5/1980 | McMahon et al. | 385/17 |
| 4,278,327 | A | 7/1981 | McMahon et al. | 349/197 |
| 4,281,904 | A | 8/1981 | Sprague et al. | 359/263 |
| 4,283,113 | A | 8/1981 | Eden | 385/18 |
| 4,367,946 | A | 1/1983 | Varner | 355/71 |
| 4,385,799 | A | 5/1983 | Soref | 385/17 |
| 4,396,252 | A | 8/1983 | Turner | 359/263 |
| 4,406,521 | A | 9/1983 | Mir et al. | 359/254 |
| 4,410,823 | A | 10/1983 | Miller et al. | 310/313 D |
| 4,451,123 | A | 5/1984 | McNeill et al. | 359/263 |
| 4,514,739 | A | 4/1985 | Johnson et al. | 347/248 |
| 4,560,994 | A | 12/1985 | Sprague | 347/239 |
| 4,563,059 | A | 1/1986 | Clark et al. | 349/123 |
| 4,585,301 | A | 4/1986 | Bialkowski | 349/243 |
| 4,645,293 | A | 2/1987 | Yoshida et al. | 385/40 |
| 4,669,831 | A | 6/1987 | Birnbaum et al. | 359/318 |
| 4,693,547 | A | 9/1987 | Soref et al. | 385/16 |
| 4,697,889 | A | 10/1987 | Takubo et al. | 359/254 |
| 4,728,167 | A | 3/1988 | Soref et al. | 385/16 |
| 4,739,520 | A | 4/1988 | Collins, Jr. et al. | 359/117 |
| 4,746,191 | A | 5/1988 | Kawakami et al. | 385/16 |
| 4,746,942 | A | 5/1988 | Moulin | 396/549 |
| 4,796,982 | A | 1/1989 | Kitabatake et al. | 359/318 |
| 4,798,435 | A | 1/1989 | Fujiwara et al. | 385/17 |
| 4,802,741 | A | 2/1989 | Kaukeinen | 359/254 |
| 4,813,771 | A | 3/1989 | Handschy et al. | 349/194 |
| 4,815,803 | A | 3/1989 | Faulkner et al. | 385/24 |
| 4,822,124 | A | 4/1989 | Suzuki | 385/17 |
| 4,842,368 | A | 6/1989 | Darcie et al. | 385/30 |
| 4,865,406 | A | 9/1989 | Khanarian et al. | 385/122 |
| 4,867,516 | A | 9/1989 | Baken | 385/3 |
| 4,867,543 | A | 9/1989 | Bennion et al. | 359/259 |
| 4,887,104 | A | 12/1989 | Kitano et al. | 359/246 |
| 4,896,930 | A | 1/1990 | Tsuchitani et al. | 385/122 |
| 4,919,522 | A | 4/1990 | Nelson | 359/246 |
| 4,952,010 | A | 8/1990 | Healey et al. | 359/11 |
| 4,973,121 | A | 11/1990 | Brophy et al. | 385/10 |
| 4,993,811 | A | 2/1991 | Blazey et al. | 359/251 |
| 5,006,285 | A | 4/1991 | Thackara et al. | 264/1.27 |
| 5,011,271 | A | 4/1991 | Saito et al. | 359/259 |
| 5,016,959 | A | 5/1991 | Diemeer | 385/16 |
| 5,031,978 | A | 7/1991 | Shibaguchi et al. | 359/206 |
| 5,033,814 | A | 7/1991 | Brown et al. | 385/16 |
| 5,036,220 | A | 7/1991 | Byer et al. | 359/328 |
| 5,040,864 | A | 8/1991 | Hong | 385/16 |
| 5,061,028 | A | 10/1991 | Khanarian et al. | 385/132 |
| 5,078,478 | A | * 1/1992 | Evans, Jr. et al. | 359/299 |
| 5,090,824 | A | 2/1992 | Nelson et al. | 385/22 |
| 5,103,492 | A | 4/1992 | Ticknor | 385/9 |
| 5,153,770 | A | * 10/1992 | Harris | 359/245 |
| 5,157,541 | A | * 10/1992 | Schildkraut et al. | 359/276 |
| 5,168,535 | A | 12/1992 | Laor | 385/16 |
| 5,182,665 | A | 1/1993 | O'Callaghan et al. | 349/201 |
| 5,189,548 | A | 2/1993 | Hecht | 359/254 |
| 5,220,643 | A | 6/1993 | Collings | 706/40 |
| 5,221,989 | A | 6/1993 | Stappaerts et al. | 359/323 |
| 5,255,332 | A | 10/1993 | Welch et al. | 385/17 |
| 5,260,719 | A | 11/1993 | Maloney | 347/135 |
| 5,267,336 | A | 11/1993 | Sriram et al. | 382/2 |
| 5,274,246 | A | 12/1993 | Hopkins et al. | 257/17 |
| 5,278,924 | A | 1/1994 | Schaffner | 385/3 |
| 5,305,136 | A | 4/1994 | Smith | 359/247 |
| 5,337,183 | A | * 8/1994 | Rosenblatt | 359/248 |
| 5,347,377 | A | 9/1994 | Revelli, Jr. et al. | 349/193 |
| 5,349,466 | A | 9/1994 | Delacourt et al. | 359/326 |
| 5,367,584 | A | 11/1994 | Ghezzo et al. | 385/17 |
| 5,367,585 | A | 11/1994 | Ghezzo et al. | 385/23 |
| 5,369,718 | A | 11/1994 | Kamata et al. | 385/21 |
| 5,396,363 | A | 3/1995 | Valette | 359/248 |
| 5,412,743 | A | 5/1995 | Brazas, Jr. | 385/2 |
| 5,416,631 | A | 5/1995 | Yagi | 359/254 |
| 5,504,772 | A | 4/1996 | Deacon et al. | 372/102 |
| 5,521,748 | A | 5/1996 | Sarraf | 359/321 |
| 5,528,414 | A | 6/1996 | Oakley | 359/257 |
| 5,581,643 | A | 12/1996 | Wu | 385/17 |
| 5,615,041 | A | 3/1997 | Field et al. | 359/326 |
| 5,631,735 | A | 5/1997 | Nagai | 356/330 |
| 5,699,462 | A | 12/1997 | Fouquet et al. | 385/18 |
| 5,732,177 | A | 3/1998 | Deacon et al. | 385/122 |
| 5,835,458 | A | 11/1998 | Bischel et al. | 369/44.12 |
| 5,862,276 | A | 1/1999 | Karras | 385/30 |
| 5,909,303 | A | * 6/1999 | Trezza et al. | 359/248 |
| 5,966,493 | A | 10/1999 | Wagoner et al. | 385/140 |
| 5,978,125 | A | 11/1999 | Yao | 359/256 |
| 6,055,087 | A | 4/2000 | Kwon et al. | 359/248 |
| 6,057,955 | A | 5/2000 | Yamamoto | 359/254 |
| 6,111,633 | A | 8/2000 | Albert et al. | 349/196 |
| 6,124,965 | A | 9/2000 | Doi et al. | 359/248 |
| 6,288,822 | B2 | 9/2001 | Romanovsky | 359/245 |
| 6,297,899 | B1 | 10/2001 | Romanovsky | 359/245 |
| 6,310,712 | B1 | 10/2001 | Romanovsky | 359/245 |

FOREIGN PATENT DOCUMENTS

| | | |
|---|---|---|
| GB | 2 304 919 A | 3/1997 |
| JP | 62-85219 | 4/1987 |
| JP | 62-267719 | 11/1987 |
| JP | 05-005922 | 1/1993 |
| JP | 06-350050 | 12/1994 |
| JP | 07-020499 | 1/1995 |
| WO | WO 90/14606 | 11/1990 |
| WO | WO 95/33219 | 12/1995 |
| WO | WO 95/34016 | 12/1995 |
| WO | WO 96/07940 | 3/1996 |
| WO | WO 96/07943 | 3/1996 |
| WO | WO 96/07945 | 3/1996 |
| WO | WO 96/07949 | 3/1996 |
| WO | WO 96/07950 | 3/1996 |
| WO | WO 96/07952 A1 | 3/1996 |
| WO | WO 96/08059 | 3/1996 |
| WO | WO 96/10776 | 4/1996 |
| WO | WO 96/18131 | 6/1996 |
| WO | WO 96/41216 | 12/1996 |
| WO | WO 97/16763 | 5/1997 |
| WO | WO 98/07279 | 2/1998 |
| WO | WO 98/10321 | 3/1998 |
| WO | WO 98/35251 | 8/1998 |
| WO | WO 98/40770 | 9/1998 |
| WO | WO 98/40771 | 9/1998 |
| WO | WO 98/40783 | 9/1998 |
| WO | WO 98/59276 | 12/1998 |
| WO | WO 99/12061 | 3/1999 |
| WO | WO 99/19763 | 4/1999 |
| WO | WO 99/22266 | 5/1999 |

OTHER PUBLICATIONS

*Crossing–Channel Waveguide Electroptic Modulators*, Gary E. Betts and William S.C. Chang, IEEE Journal of Quantum Electronics, vol. QE–22, No. 7, Jul. 1986, pp. 1027–1038.

*Crystallization of Lanthanum–Modified Lead Zirconate Titanate (PLZT) Using Coprecipitated Gels*, Yao–Jung Lee, Fu–Su Yen, Jong–Ping Wu and Hsing–I Hsiang, Jpn. J. Appl. Phys. vol. 34, Pt. 1, No. 8A, Aug. 1995, pp. 4137–4142.

*Deposition and Characterization of Thin Ferroelectric Lead Lanthanum Zirconate Titanate (PLZT) Films on Sapphire For Spatial Light Modulators Applications*, S. Krishnakumar, V.H. Ozguz, C. Fan, C. Cozzolino, S.C. Esener and S.H. Lee, IEEE Transactions on Ultrasonics, Ferroelectrics and Frequency Control, vol. 38, No. 6, Nov. 1991, pp. 585–590.

*Electrooptic Light Modulators*, I.P. Kaminow and E.H. Turner, Proceedings of the IEEE, vol. 54, No. 10, Oct. 1966, pp. 1374–1390.

*Electrooptical Channel Waveguide Matrix Switch Using Total Internal Reflection*, F.R. El–Akkari, C.L. Chang, and C.S. Tsai, Topical Meeting on Integrated and Guided Wave Optics, Incline Village, Nev., Paper TuE4, 1980.

*Electrooptics, Phenomena, Materials and Applications*, Fernando Agulló–López, José Manuel Cabrera, Fernando Agulló–Rueda, Academic Press, Harcourt Brace & Company Publishers, 1994, pp. 193–197.

*High Speed Optical TIR Switches Using PLZT Thin–Film Waveguides on Sapphire*, Hidetaka Higashino, Takao Kawaguchi, Hideaki Adachi, Toshihiko Makino and Osamu Yamazaki, Proceedings of the Sixth International meeting on Ferroelectricity, Kobe, 1985, Jpn. J. Appl. Phys. vol 24 (1985) Suppl. 24–2, p. 284.

*One–Dimensional Silicon/PLZT Spatial Light Modulators*, Sadik C. Esener, Jing H. Wang, Timothy J. Drabik, Mark A. Title and Sing H. Lee, Optical Engineering, May 1987, vol. 26, No. 5, pp. 406–413.

*PLZT Laser Beam Modulator*, Maris Ozolinsh, Paulis Paulins, Ansis Viesturs, Maris Kundzins, Karlis Kundzins, Andris Krumins, Ferroelectrics, 1992, vol. 128, pp. 73–78.

*Preparation of Pb(Zr,Ti)O$_3$ Thin Films by Sol–Gel Technique*, Tomoyasu Takusagawa, Noriaki Yamada, Terumasa Kato, Hajime Hattori and Teruyuki Matsui, Jpn. J. Appl. Phys. vol. 33, Pt. 1, No. 9B, 1994, pp. 5151–5154.

Utsunomiya et al., Japanese Journal of Applied Physics, vol. 24, Supplement 24–3 May, 1985, pp. 169–171.

P. Shames et al, *Modeling and optimization of electro–optic phase modulator*, Article on Web at http://kfir.ucsd.edu/papers/Modeling.pdf, No date available.

8×8 Optical Waveguide Switch Using Liquid Crystal, Hiroshi Terui and Morio Kobayashi, Integrated Optical Circuit Engineering, SPIE, vol. 517, 1984, pp. 267–274.

A Low–Crosstalk Microoptic Liquid Crystal Switch, Skinner & Lane, IEEE Journal on Selected Areas in Communications, 6(7):1178–1185 (1988).

A Very Low Operation Current InGaAsP/InP Total Internal Reflection Optical Switch using p/n/p/n Current Blocking Layers, Kwang–Ryong Oh, Ki–Sung Park, Dae–Kon Oh, Hong–Man Kim, Hyung Moo Park and KwyRo Lee, IEEE Photonics Technology Letter, vol. 6, No. 1, Jan. 1994, pp. 65–67.

Digital Optical Switch, Y Silberberg, P. Perlmutter and J.E. Baran, Appl. Phys. Lett., vol. 51 No. 16, Oct. 19, 1987, pp. 1230–1232.

Electro–Optic Switching Using Total Internal Reflection by a Ferroelectric Liquid Crystal, Meadows et al., Appl. Phys. Lett., 54(15):1394–1396 (1989).

Linear total internal reflection spatial light modulator for laser printing, Robert A. Sprague, William D. Turner, Lawrence N. Flores, SPIE vol. 299 Advances in Laser Scanning Technology (1981), pp. 68–75.

Liquid Crystal Switching Components, Richard A. Soref, Proceedings: Fiber Optic Communications (1980).

Optical Switch Utilizing Total Reflection of (Pb, La) (Zr, Ti)O$_3$ Ceramics, Toshio Utsunomiya, Jpn J. Appl. Phys. vol. 33 (1994) pp. 5440–5442 Part 1, No. 9B, Sep. 1994.

Total Reflection Liquid–Crystal Electrooptic Device, R.A. Kashnow and C.R. Stein, Applied Optics, vol. 12, No. 10, Oct. 1973, pp. 2309–2311.

Total Switching of Unpoloarized Fiber With a Four–Port Electro–Optic Liquid–Crystal Device, R.A. Soref and D.H. McMahon, Optical Society of America, 5(4):147–149 (1980).

*Optical TIR Switches Using PLZT Thin–Film Waveguides on Sapphire*, Kiyotaka Wasa et al., Journal of Lightwave Technology, vol. LT–2, No. 5, pp. 710–713, Oct. 1984.

*Integrated Optical Devices Based on Nonlinear Optical Polymers*, Emmanuel Van Tomme et al., IEEE Journal of Quantum Electronics, vol. 27, No. 3. Mar. 1991, pp. 778–787.

*Electro–Optic Functional Waveguide Using New Polymer p–NAn–PVA for Integrated Photonic Devices*, Shogo Ura et al., Jpn. J. Appl. Phys., vol. 31 (1992) pp. 1378–1381.

*Mirror–type optical branch and switch*, H. Naitoh et al., Applied Optics, vol. 17, No. 1, Jan. 1, 1978, pp. 101–104.

*Electrically active optical bifurcation: BOA*, M. Papuchon et al., Applied Physics Letters, vol. 31, No. 4, Aug. 15, 1977, pp. 226–267.

*Theoretical and Experimental Studies on Active Y–Junctions in Optical Waveguides*, Hiroshi Sasaki et al., IEEE Journal of Quantum Electronics, vol. QE–14, No. 11, Nov. 1978, pp. 883–892.

*Integrated Optics Components and Devices Using Periodic Structures*, Toshiaki Suhara et al., IEEE Journal of Quantum Electronics, vol. QE–22, No. 6, Jun. 1986, pp. 845–867.

CLEO'93/Tuesday Afternoon, CTuN63, *Thin–film electro–optic beam deflector using domain reversal in LiTaO$_3$*, Qibiao Chen et al, pp. 196–197 (1993).

*Poled electro–optic waveguide formation in thin–film organic media*, J.I. Thackara et al., Appl. Phys. Lett. 52 (13), Mar. 28, 1988, pp. 1031–1033.

*Electrooptical switching in thin film waveguides for a computer communication bus*, R. A. Becker et al., Applied Optics, vol. 18, No. 19, Oct. 1, 1979, pp. 3296–3300.

*Prism–Type Optical Deflector Using PLZT Ceramics*, Toshio Utsunomiya et al., Japanese Journal of Applied Physics, vol. 24, (1985) Supplement 24–3, pp. 169–171, May 1985.

Nishihara et al., *Optical Integrated Circuits*, McGraw–Hill Book Company, Copyright 1985, 1989, pp. 294–296, 305, 341.

Patent Abstracts of Japan, Publication No. 56–101123, Publication Date: Aug. 13, 1981.

Patent Abstracts of Japan, Publication No. 60–097319, Publication Date: May 31, 1985.
Patent Abstracts of Japan, Publication No. 05–281583, Publication Date: Oct. 29, 1993.
Patent Abstracts of Japan, Publication No. 02–002531, Publication Date: Jan. 8, 1990.
Pending U.S. patent application, U.S. Ser. No. 09/530,318, filed Jun. 30, 2000 and Amendment filed Apr. 22, 2002.
Pending U.S. patent application, U.S. Ser. No. 09/434,085, filed Nov. 5, 1999 and Amendment filed Oct. 25, 2001.
Pending U.S. patent application, U.S. Ser. No. 10/013,336, filed Nov. 5, 2001.
Pending U.S. patent application, U.S. Ser. No. 10/033,153, filed Oct. 25, 2001.

* cited by examiner

TOTAL INTERNAL REFLECTION LIGHT MODULATING MICROSTRUCTURE DEVICES

This application is a continuation of patent application Ser. No. 09/434,085, filed Nov. 5, 1999, now U.S. Pat. No. 6,381,060, which is a continuation-in-part of patent application Ser. No. 08/959,778, filed on Oct. 29, 1997, now U.S. Pat. No. 6,310,712.

TECHNICAL FIELD

The present invention relates generally to light modulators and light switches, and more particularly to electro-optic modulators. The inventor anticipates that primary application of the present invention will be in high-speed signal processing and it may also be used in optical interconnects, telecommunications and flat panel displays.

BACKGROUND ART

Electro-optic modulators have been well known in the art for years, but for multi-channel applications they have suffered from several disadvantages. Prior art modulator arrays have usually been formed from single wafers of electro-optically active material onto which surface electrodes have been attached, to form channels which are defined by the electric field lines within the optical wafer. Cross-talk, or interference between channels, has been a problem because electro-optic modulators are vulnerable on at least two levels. Since the channels are not restricted except by the electric field lines, activity in one channel can easily induce electro-optic interference in a nearby channel. This is in addition to usual electrical cross-talk experienced by closely grouped and unshielded electrical contacts. Also, previous electro-optic modulators and light switches have often relied on surface deposited electrodes, which produce electric field lines that are fringed, rather than channeled and directed. Due to the exponential decay of the electric field intensity inside the material, very high voltages may be required to drive the material to produce the desired electro-optic effect.

Electro-optic materials, such as $LiNbO_3$, can be expensive, and can require high driving voltages. Liquid crystal modulators have also been used, but response times for this type are typically very slow, on the order of milliseconds. Also, the electro-optic effect exhibited by a material can be of several different orders, depending on the material. A first order effect, called the Pockels effect, is linear in its response to increase in applied voltage. A second order effect, called the Kerr effect, is quadratic in its response, thus a greater increase in effect can be produced relative to an increase in voltage. This can theoretically allow smaller driving voltages in a primarily Kerr effect material to be applied to produce a comparable electro-optic effect compared to material which produces primarily Pockels effect.

Lead zirconate titanate polycrystalline ceramic which is doped with lanthanum (PLZT) is a relatively inexpensive, optically transparent ceramic which can be made to exhibit either the quadratic Kerr effect or the linear Pockels effect, depending on the composition, and can be formed into wafers easily and used in sol-gel moldings. The concentrate of lanthanum, or "doping", is variable, and can lead to varying characteristics in the material. PLZT that is commercially available is typically made from a "recipe" which produces a very high dielectric constant $\kappa$. Very high $\kappa$ values produce high capacitance values C, which in turn produce high power requirements, as power (P) is proportional to $CV^2/2$ where V=voltage. High power consumption in turn generates heat, so that some modulators that require high voltage also may require cooling. If the proportion of lanthanum dopant, or other components, in the material is adjusted, the dielectric constant value and electro-optic constant value, as well as the type of electro-optic effect (Kerr or Pockels), may also be varied, with the result affecting capacitance and power consumption.

Prior art inventions for modulating light in arrays generally suffer from common problems experienced by multi-channel optical and electrical systems in which the channels are not appropriately isolated. As discussed above, interference is easily induced in nearby channels resulting in cross-talk which can distort image clarity and corrupt data transmissions. Additionally, much of the prior art requires high driving voltages that are incompatible with TTL level power supplies.

U.S. Pat. No. 4,746,942 by Moulin shows a wafer of PLZT electro-optic ceramic material with a large number of surface mounted electrodes. This invention suffers from the disadvantage of cross-talk between channels, although there is discussion of attempts to decrease cross-talk by use of large electrodes and increased space of the electro-optic windows. This results in less efficient use of the material. Although typical driving voltages are not given, with larger areas of material, higher applied voltages become necessary to provide the necessary electric field density in the wafer.

U.S. Pat. No. 4,867,543 by Bennion et al. describes a spatial light modulator made of a solid sheet layer of electro-optic material such as PLZT, which has paired surface electrodes. This has the disadvantage of requiring a driving voltage of approximately 20 volts to produce a phase retardation of PI radians. U.S. Pat. No. 4,406,521 by Mir et al. discloses a panel of electro-optic material which uses electrodes to define pixel regions. It speaks of using voltages in the range of 100–200 volts. U.S. Pat. No. 5,033,814 by Brown et al. also shows a single slab of electro-optic material which requires a driving voltage of 150 volts. U.S. Pat. No. 5,528,414 to Oakley discloses a single wafer of Pockels crystal with surface mounted electrodes requiring a 70 volt driving voltage. Besides being obviously incompatible with TTL voltage levels, none of these inventions have any mechanism for confining electric field lines. Also, in general, use of higher driving voltages will generate heat in the electro-optic material, which can mean that a cooling system may be required.

U.S. Pat. No. 5,220,643 by Collings discusses an array of optical modulators which are built into a neural network. These modulators are mostly of liquid crystal type, although use of PLZT is mentioned. U.S. Pat. No. 4,560,994 by Sprague shows a single slab of electro-optic material with an array of electrodes which create fringe electric fields, which are not channeled. Sarraf's U.S. Pat. No. 5,521,748 also discloses a modulator array in which mirror-like devices deflect or deform when electrostatic force is applied. U.S. Pat. No. 4,367,946 to Varner also discusses a light valve array, with one specifically preferred material being PLZT. However, all four of these inventions can be expected to have the same problems of cross-talk, which the present invention is designed to eliminate.

For the foregoing reasons, there is a need for an array of discrete light modulating elements which can operate at TTL voltage levels, and at high speeds, with almost no cross-talk, and which can be used to produce small pixels or which can be grouped together to create larger pixels and large two dimensional panels or sheets.

DISCLOSURE OF THE INVENTION

Accordingly, it is an object of the present invention to provide an array of discrete modulated elements of electro-optic material.

Another object of the invention is to provide arrays of electro-optically modulators that can be driven by TTL voltages, and thus be compatible with standard TTL power supplies.

Yet another object of the invention is to produce arrays of electro-optic modulators which have very little cross-talk between channels.

Still another object of the present invention is to provide an array with very fast response and switching time.

A further object of the present invention is to provide an array of pixels which can be of very small dimensions to reduce problems of aliasing in optical displays.

A yet further object of the present invention is to produce light modulating arrays that can be manufactured by conventional methods very inexpensively.

Briefly, one preferred embodiment of the present invention is a light modulating including a switching element having a first portion of electro-optic material to which first and second electrodes are associated. A second portion is composed of material having an index of refraction matching that of the first portion when no voltage is applied to electro-optically activate the first portion but the index of refraction of the second portion is less than the index of refraction of the first portion when the first portion is electro-optically activated by application of voltage to the electrodes. The first and second portions are in close conjunction with each other such that a TIR boundary is formed at the junction of the first and second portions and the switching element is oriented with respect to at least one incident light beam such that the incident light beam enters the first portion and strikes the boundary at an angle such that the light beam is totally reflected internally when the first portion is electro-optically activated, but which will pass unreflected through the boundary when the first portion is not electro-optically activated.

A second preferred embodiment uses an element in which the thickness of the second portion is reduced by removal of a step region so that electric field lines within the active first portion are more narrowly directed and the TIR boundary is flatter and more regular. The step region is filled with a material having a low dielectric constant k.

A third preferred embodiment uses a number of optical switches in an array or matrix to create N×N or N×M cross-connect switches.

An advantage of the present invention is that it may be operated with TTL voltages or lower.

Another advantage of the invention is that because of the low voltage requirements, heating of the elements is reduced and requirements for cooling are minimized.

Yet another advantage of the present invention is that very small elements may be produced, thus allowing for very fine image resolution.

A further advantage of the present invention is that cross-talk between channels is nearly eliminated.

A still further advantage of the present invention is that standard micro-machining operations can be used, allowing for inexpensive manufacture.

A yet further advantage of the present invention is that sol-gel processes can be used to create arrays very inexpensively.

Still another advantage of the present invention is that the elements can be very rapidly switched, with switching times on the order of pico-seconds ($10^{-12}$ seconds).

Yet another advantage of the present invention is that sol-gel processes can be used to make displays which are both thin and flexible. These molding processes can produce arrays with large numbers of elements quickly and for very low cost.

These and other objects and advantages of the present invention will become clear to those skilled in the art in view of the description of the best presently known mode of carrying out the invention and the industrial applicability of the preferred embodiment as described herein and as illustrated in the several figures of the drawings.

BRIEF DESCRIPTION OF THE DRAWINGS

The purposes and advantages of the present invention will be apparent from the following detailed description in conjunction with the appended drawings in which.

BEST MODE FOR CARRYING OUT THE INVENTION

A preferred embodiment of the present invention is an array of light modulating and switching microstructure devices. The present invention solves many of the problems of the prior art by using lanthanum doped lead zirconate titanate crystal (PLZT), which is an optically transparent ceramic that becomes birefringent when proper voltage is applied. PLZT has a quadratic electro-optic response to voltage increase thus allowing lower driving voltages. In addition, the present invention uses an optimized compositional "recipe" in which the proportion of lanthanum dopant and matrix elements has been designed to produce low dielectric constant κ, higher electro-optic efficiency, and thus low power requirements. Additionally, the electro-optic elements are 3-dimensional and of very small size, generally 10 μm–200 μm in the light propagation direction, or much less, depending on the design. This allows production of very high-density electric fields in these elements by using small voltages, including TTL levels of approximately 5 volts, and lower. This has advantages because power supplies that are already set up for TTL level digital components can supply the electro-optic modulators as well. Cross-talk has been nearly eliminated by the use of grooves or regions which are filled with air'or other dielectric materials. These physically separate at least a portion of the elements, thus directing and channeling electric field lines more closely. PLZT, as well as other electro-optic materials, also allows for pico-second response time, thus theoretically allowing very high switching frequencies of 100 GHz and more.

The use of embedded electrodes produces more uniform electric field strength in the elements. This allows a much lower driving voltage and a much more predictable and controllable electric field.

The present invention is also useful when using standard recipe electro-optic materials, in which the dielectric constant has not been minimized, and also in a variety of other electro-optic materials beside PLZT. Electro-optic materials fall generally into five categories, 1) electro-optic crystals, 2) polycrystalline electro-optic ceramics, 3) electro-optically active polymers, 4) electro-optic semiconductors, and 5) electro-optic glasses. Although the electro-optic properties of the materials are variable depending on composition, the present invention can be implemented with materials of any of these three categories. Specific examples of electro-optic materials besides PLZT which may be used include, but are not limited to, $LiNbO_3$, $LiTaO_3$, BSN, PBN, KTN, KDP, KD*P, KTP, $BaTiO_3$, $Ba_2NaNb_5O_{15}$, GaAs, InP, CdS, $AgGaS_2$, and $ZnGeP_2$. The very small dimensions of the elements result in very low element capacitance even when using material having a relatively large dielectric constant κ.

Figure 1:
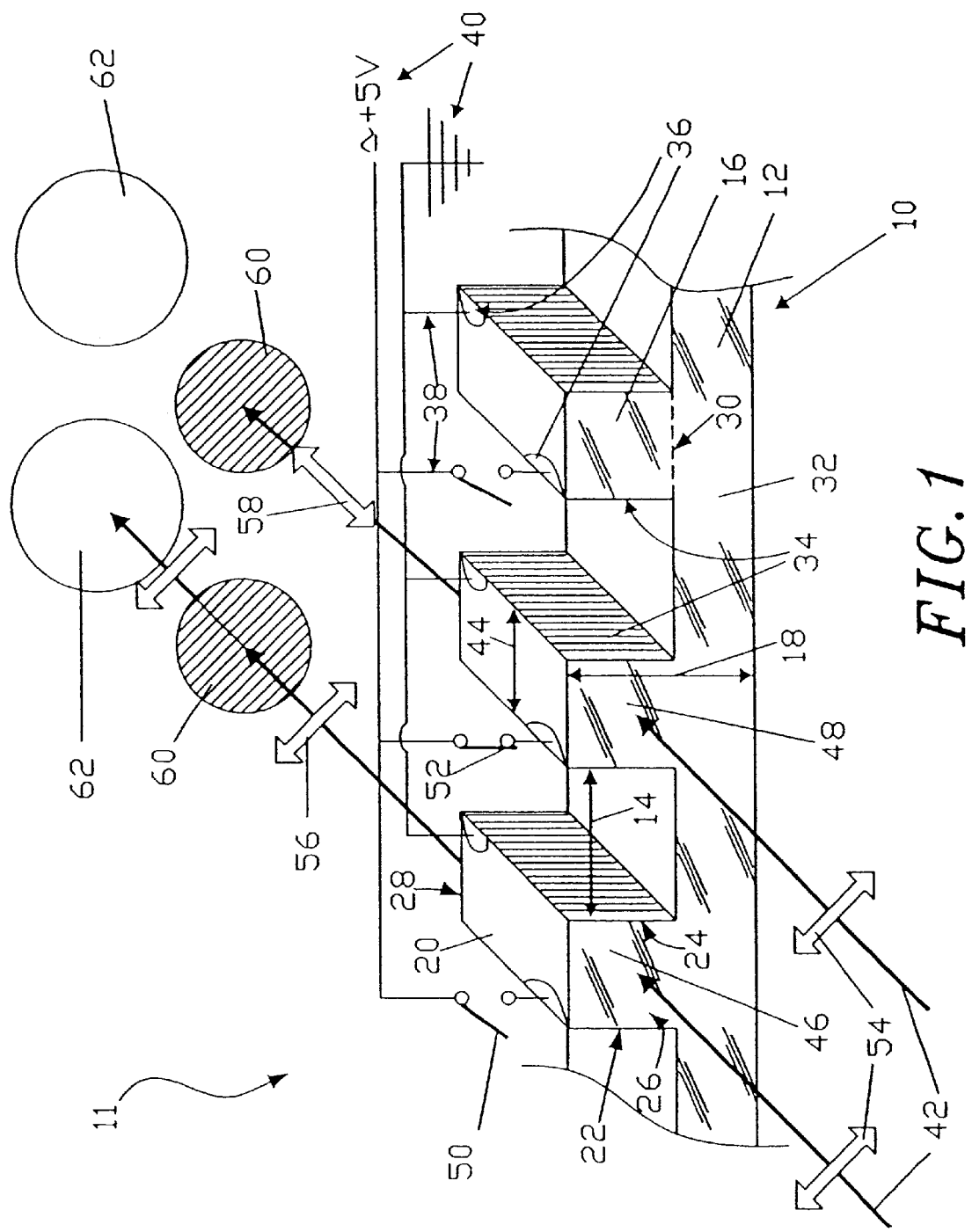
FIG. 1 is a perspective view of a system for modulating and switching light beams which uses a light modulating array, showing the modulation of impinging light beams.

As illustrated in the various drawings herein, and particularly in the view of FIG. 1, a form of this preferred embodiment of the inventive device is depicted by the general reference character 10.

FIG. 1 illustrates an array of light modulating microstructures 10 as well as a system 11 for modulating or switching light in a number of independent channels. In this preferred embodiment, the array 10 is formed from a wafer 12 of PLZT. PLZT has been chosen for its large electro-optic effect and low absorption for thin wafers.

If PLZT is used, the relative proportion of the Lanthanum dopant in the ceramic can be very important in determining the driving voltage required for the elements. The composition also is important in establishing the optical properties such as transparency, grain size and pore size, speed, power dissipation, operating temperature and for maximizing both the linear and the quadratic electro-optic coefficients of the material. Commercial recipes for PLZT have largely used Lanthanum concentrations of 9.0% to 12%. If Lanthanum concentration is varied in the range of 8.5% to 9.0% of the PLZT ceramic and the concentration of Zirconium and Titanium are unchanged from typical ratios of 65/35, it may be possible to achieve a higher quadratic electro-optic coefficient (R) in the PLZT for the La dopant percentage closer to 8.5%. For the PLZT compositions, where Zr and Ti are maintained in a 65/35 ratio and the overall percentage of La is varied:

$La=9.5\%, R=1.5\times10^{-16}$ m$^2$/V$^2$;

$La=9.0\%, R=3.8\times10^{-16}$ m$^2$/V$^2$.

It is known that for La<8.0%, PLZT loses quadratic electro-optic properties. It is therefore expected that somewhere around 8.5% La there should be a maximum for R around $(5-40)\times10^{-16}$ m$^2$/V$^2$.

This enhanced value of electro-optic coefficient provides many advantages. It will permit lower required driving voltages, and thus lower power dissipation in the material and hence lower heating of the device. This in turn allows the device to be driven at significantly higher frequencies, even without external cooling. Also, the use of lower La concentrations (which is a free electron donor) will result in a reduced "charge screening" effect. The overall result is higher modulation efficiency of devices manufactured from this material.

The wafer 12 has regions or grooves 14 formed to produce protrusions 16 from the original thickness 18 of the wafer 12. The grooves 14 may be formed by any number of means, such as mechanical machining with micro-saws, chemical etching using photo-resist masks, or laser ablation, or the array may be molded in shape from polycrystalline ceramic, among other methods. The grooves 14 provide isolation between the channels of the array 10, serve to direct and channel the electric field lines in the electro-optic material and thus allow the array to operate with nearly zero cross-talk.

Each protrusion 16 has a top face 20, a first side face 22 and a second side face 24, a front face 26 and a rear face 28. The grooves 14 can be cut through the entire original thickness 18 of the wafer 12, in which case, the protrusions will have an independent bottom face 30, or if the groove is not cut through the entire original thickness 18, the bottom face 30 will be integral with the wafer 12, as shown by the dotted line in FIG. 1.

The faces of the wafer 32 can be polished either before or after the grooves 14 are formed, to prevent scattering of light entering or leaving the wafer 12. Electrodes 34 are attached to the protrusions 16 by any of a number of ways, but one preferred method is to embed the electrodes 34, as this may produce a more uniform electrical field. It is also possible that the material of the electrode 34 may completely fill the grooves 14. Conductive pads 36 of gold or some other metal or conductive material are used to attach electrical leads 38 to the electrodes 34, which connect them in turn to the electrical power supply 40. An electrical field is thus established which is oriented in a transverse direction relative to the direction of the incoming light beams 42. The width of electro-optic material between the grooves 14 in the protrusions 16 establishes the electrode gap 44 in this configuration of electrode 34 placement.

For ease of reference, an assembly containing a protrusion 16, attached electrodes 34, and conductive pads 36 shall be referred to as an "element". The size of the wafer 12, the protrusions 16 and the electrode gaps 44 will depend on the material chosen, and the desired range of applied voltages to be used. The electro-optic effect exhibited by an element of a particular material depends on the electric field strength within that element. The density of that field will in turn depend on the amount of applied voltage, the material chosen, and the physical dimensions of the element in which the electric field is contained. Using very small elements allows a large concentration of electric field density by use of small to moderate voltages. In the present invention, in order to use voltages in the TTL a range, around 5V, it is estimated that the physical size of the elements, if made of PLZT, will be on the order of 20 $\mu$m×20 $\mu$m×200 $\mu$m. The grooves 14 can be made very small, and indeed may be limited by the size of machining tools used to form them. Excellent results in terms of near zero cross-talk have been achieved using micro-sawing methods where the kerf size of the saw cuts are around 25 $\mu$m. Effective reduction of cross-talk between channels may be achieved with grooves as small as 5 $\mu$m.

Such tiny elements can produce modulated beams of very small size, producing such fine image resolution that the unaided eye is incapable of distinguishing it. It may have applications where microscopic images are required, or where multiple beams are combined in groups of 5 or 10 elements to make up 1 pixel in a display device.

The size of the elements will also depend on whether the beam is transmitted through the element or reflected from a rear surface, in which case, the length or the driving voltage can be cut roughly in half to produce the same degree of modulation. Materials with smaller electro-optic properties may require greater size or increased applied voltage to achieve proper modulation results.

In FIG. 1, a first element 46 and a second element 48 are shown, which in this preferred embodiment, will be assumed to be composed of PLZT. Between the first element 46 and the voltage supply line, an open switch 50 is shown to represent that the element 46 has no voltage applied, and is in an inactive state. It is, of course, to be understood that nothing so primitive as throw-switches need be used to practice the invention. Most likely, very high frequency (perhaps as much as 100 GHz or more) square waves of appropriate voltage will be used, but throw-switches are used here as an easy means of illustrating the state of the applied voltage.

The incoming light beams 42 having incoming linear polarization 54 which is aligned with the upper tip 45 degrees to the left of vertical, (which shall be referred to as "R" polarization) impinge on both elements 46 and 48. This incoming light may be linearly polarized laser light, or it may be initially unpolarized light, perhaps even including light from an incandescent bulb, which has been transmitted through a polarizer to produce linearly polarized light. First element 46 is inactive, thus the outgoing polarization 56 of the first element 46 is unchanged. It passes through an R aligned polarizer 60 and is detected by a light sensor or photo detector 62, perhaps to be recognized as a digital "1".

In contrast, switch 52 is closed leading to the second element 48, thus the supply voltage is applied and the element 48 is active. The element 48 becomes birefringent under the influence of the applied electric field. Birefringence causes an incoming beam 42 which is linearly polarized at a 45 degree angle relative to the direction of the applied electric field to split into two orthogonal components which are respectively parallel and perpendicular to the electric field lines. These components travel along the same path but at different velocities. The electro-optic effect thus will cause a phase shift between the two components, as one is retarded in relation to the other. After traveling through the element 48, the components re-combine with the result that the polarization of the emergent beam 58 is changed. If the voltage is sufficient to cause a $\lambda/2$ shift in polarization, the polarization will be rotated by 90 degrees, relative to its original orientation. In FIG. 1, it is assumed that a $\lambda/2$ voltage of 5 volts has been applied which produces a 90 degree phase shift to give a linearly polarized output beam 58, which is oriented with the upper tip now 45 degrees to the right of vertical (which shall be referred to as "S" polarization). This S polarized light is now blocked by the R aligned polarizer 60, which allows no light to reach the detector 62. This may be recognized by a digital device as a "0".

If the applied voltage causes a $\lambda/4$ rotation, the outgoing polarization 58 will be made into circular polarization, as the tip of the resultant electric field vector will describe a circle as it propagates. Intermediate voltage values will result in elliptical polarization. These will be incompletely blocked by the polarizer 60, which will allow only the R aligned component to pass. Thus, the light seen by the detector 62 may be theoretically controlled anywhere in the range from undiminished incoming intensity to total extinction, to produce analog-type output signals if the appropriate control voltage is applied.

Figure 2:
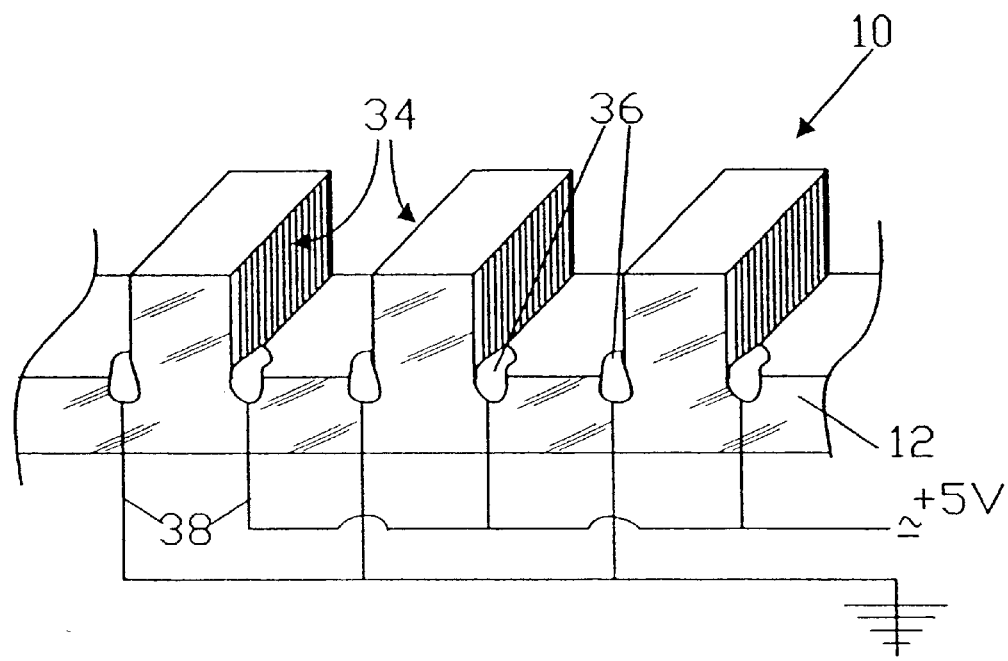
FIG. 2 is a perspective view of a modulator array, and electrical circuit showing an alternative location for conductive pads.

FIG. 2 illustrates a different version of the modulator array 10. A wafer 12 is shown with attached or embedded electrodes 34, and in this embodiment, the conductive pads 36 are located in a different configuration for attachment to electrical leads 38.

Figure 3:
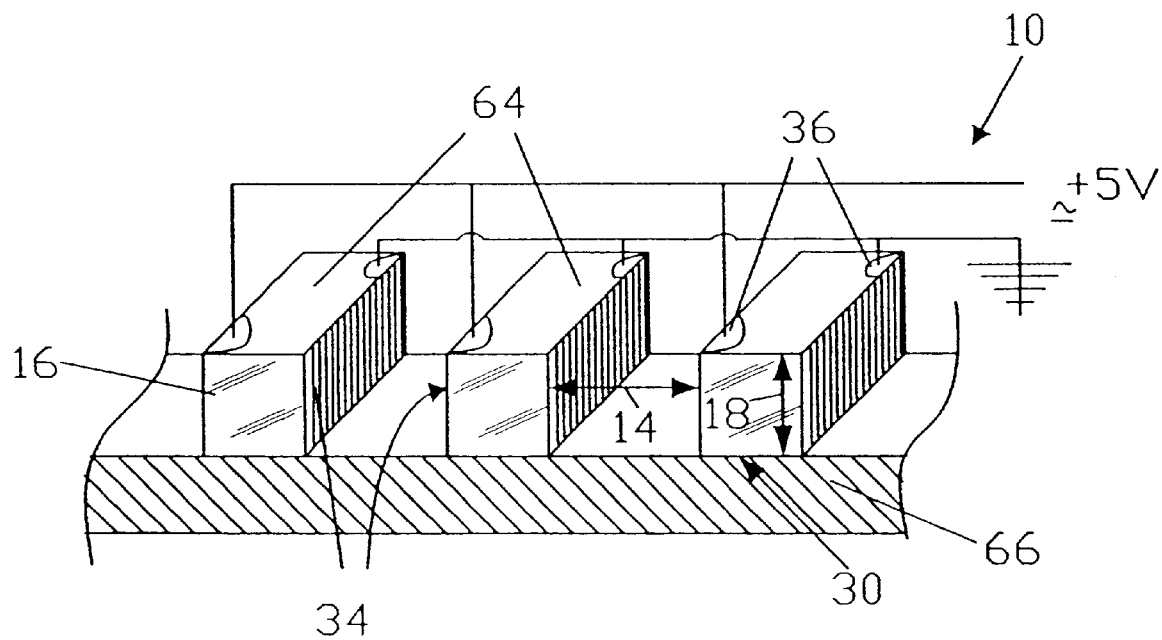
FIG. 3 is a perspective view of a modulator array, and electrical circuit showing the elements mounted on a substrate of different material.

FIG. 3 illustrates another version of the modulator array 10, in which the grooves 14 have been extended completely through the original thickness 18 of the wafer. The elements 64 here are composed of the protrusion 16 portions of the wafer 12 and their respective attached or embedded electrodes 22 and conductive pads 24 (see FIG. 1). A number of elements 64 have been formed on a substrate 66 made from a different material which the bottom faces 30 now contact. This substrate 66 is preferably a low dielectric material that is not electro-optically active, such as $SiO_2$, for one example among many. The protrusions 16 may be attached or glued to the substrate 66 prior to machining or attachment of the electrodes 34 and pads 36, or the completed elements 64 may be assembled prior to attachment to the substrate 66.

Figure 4:
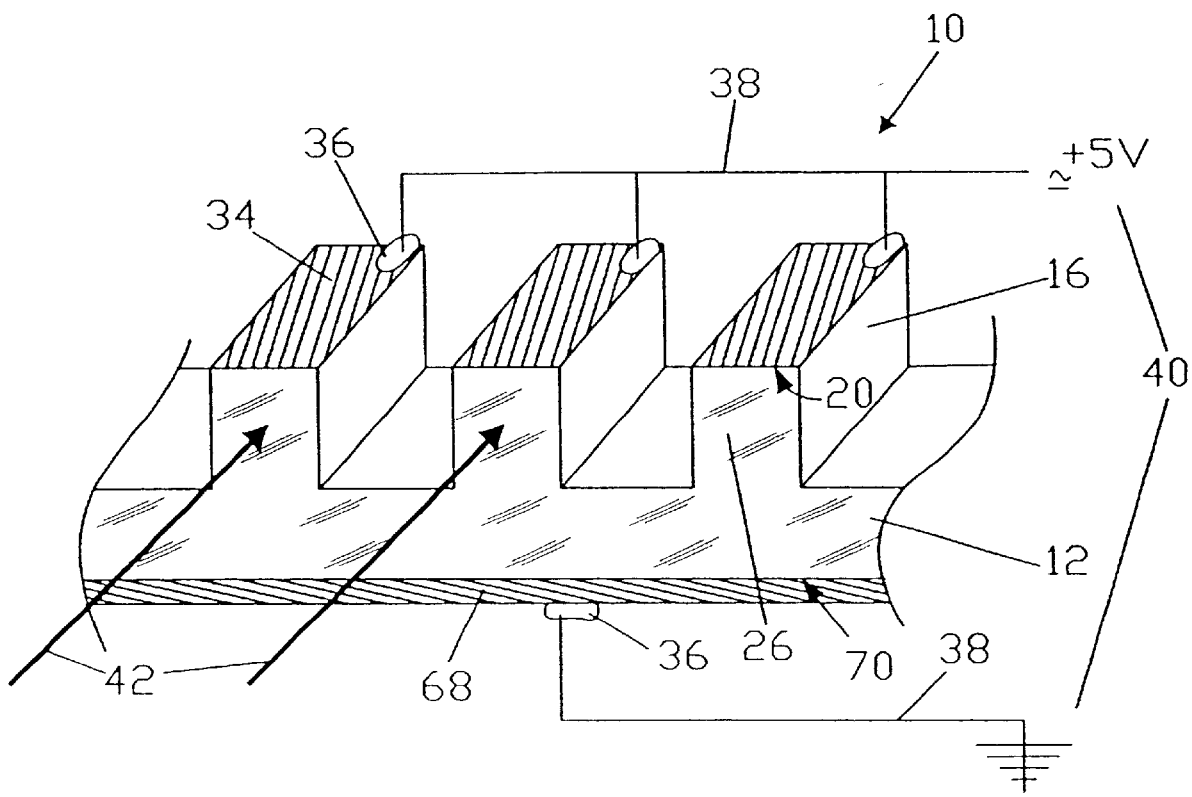
FIG. 4 is a perspective view of a modulator array and electrical circuit in which electrodes have been attached to the top and bottom wafer surfaces.

FIG. 4 shows yet another version of the modulator array 10. In this embodiment, electrodes 34 are attached to the top faces 20 of the protrusions 16 and a single large electrode 68 is positioned on the bottom side 70 of the wafer 12. It is to be understood that a plurality of appropriately placed individual electrodes could be used on the bottom side 70 of the wafer 12 in place of the single large electrode 68 pictured here and in the following FIG. 5. Conducting pads 36 are attached to the top and bottom electrodes 34, 68 as attachment points for the electrical leads 38. Polished front faces 26 are indicated as before, and incoming light beams 42 are shown to indicate orientation. The polarization direction has not been shown, as the principles of phase retardation operate much the same as in FIG. 1, with a $\lambda/2$ shift producing a 90 degree rotation, etc. This placement of electrodes 34, 68 produces a different orientation of transverse electrical fields, but still retains the advantage of channel separation and minimization of cross-talk which was unavailable in the prior art.

Figure 5:
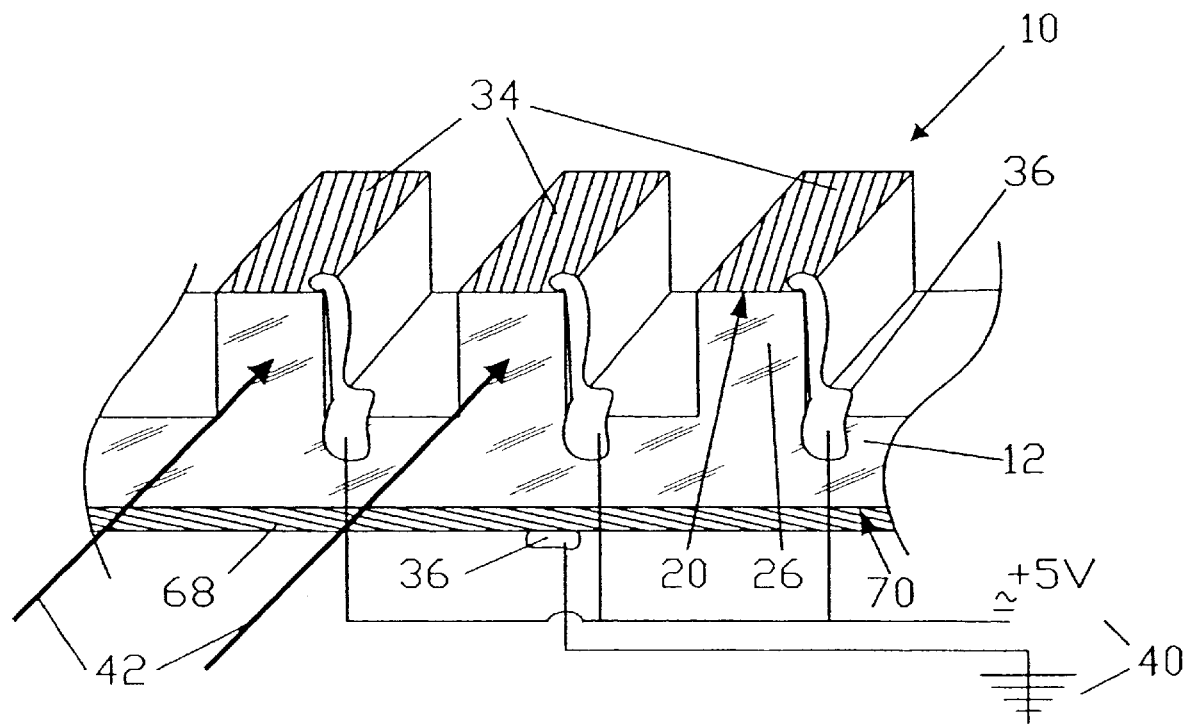
FIG. 5 is a perspective view of a modulator array and electrical circuit showing an alternate location for conductive pads.

FIG. 5 shows a variation of the configuration in FIG. 4, in which the upper conductive pads 36 are located in a different orientation relative to the wafer 12. The top and bottom electrodes 34, 68 are positioned as in FIG. 4, to produce a transverse electric field. The polished front faces 26 and incoming light beams 42 are again shown for orientation purposes.

Although not pictured here, it is to be understood that this arrangement of top and bottom electrodes and the variations in conductive pad locations seen in FIGS. 4 and 5 can be used with elements which have been positioned on a different substrate material, in the manner suggested by FIG. 3, if the substrate material has the proper conductive properties. It may also be possible for elements to be directly attached to a single large bottom electrode which can act as a substrate to support and position the elements. Alternately, the electrodes may be attached or embedded on both sides of the electro-optic material directly before mounting the assembled elements onto a substrate.

Figure 6:
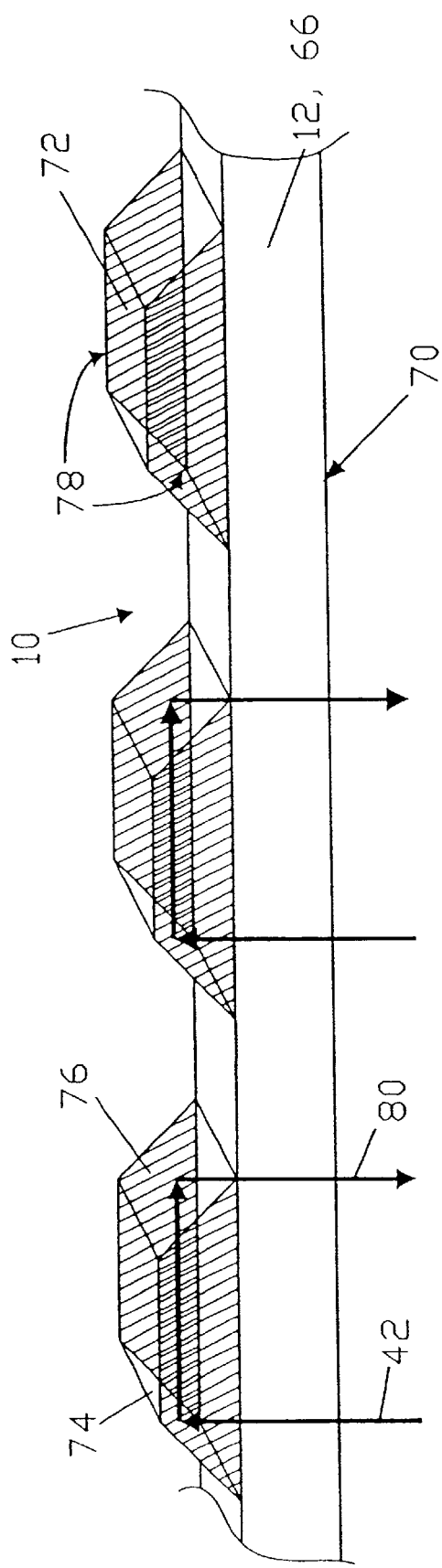
FIG. 6 is a perspective view of an alternate embodiment of a modulator array and electrodes.

FIG. 6 shows another version of an array 10 of modified protrusions 72 which have either been formed on the original wafer 12 or formed separately on a substrate of different optically transparent material 66 in a similar manner to the embodiment shown in FIG. 3. The modified protrusions 72 are shown to be oriented with their long sides parallel to the long edge of the wafer 12 or substrate 66, but it should be understood that they may also be oriented with the long sides of the protrusions 72 transverse to the long edge of the wafer 12 or substrate 66. An incoming polarized light beam 42 enters from the bottom side 70 of the wafer 12 or substrate 66 and is internally reflected on the angled first side face 74 and angled second side face 76 to reemerge from the bottom side 70 of the wafer 12. If appropriate voltage has been applied to the electrodes 78, the resulting polarization of the emergent light beam 80 will be modulated in the manner described above. The angles of the faces here are chosen to allow total internal reflection, but it is to be understood that if a reflective coating is applied to the faces, a variety of other angles may be used as well.

Figure 7:
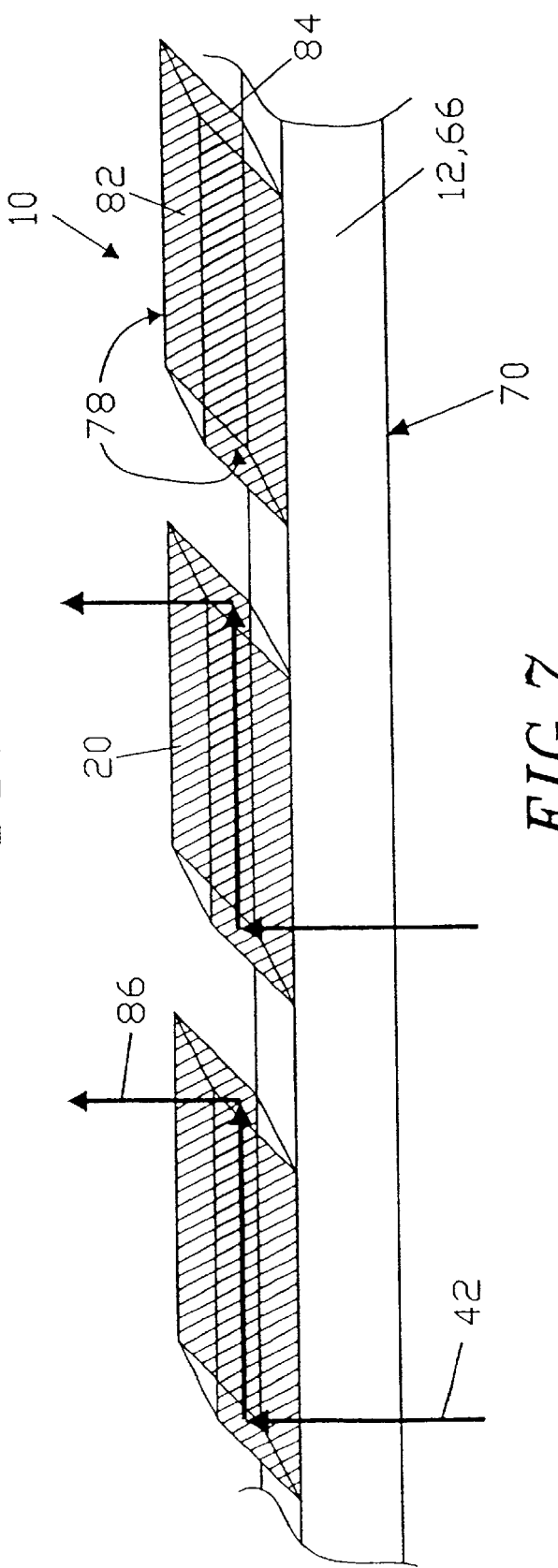
FIG. 7 is a perspective view of another alternative embodiment of a modulator array and electrodes.

FIG. 7 illustrates yet another version of a modulator array 10 in which the protrusions 82 have been modified in another manner such that the angled second side face 84 of each has been angled to direct the emergent beam 86 out of the top face 20 of each protrusion 82. As in FIG. 6, the protrusions may be oriented in a transverse direction, a different substrate material may be used, and a reflective coating may be applied to reflecting faces.

Figure 8:
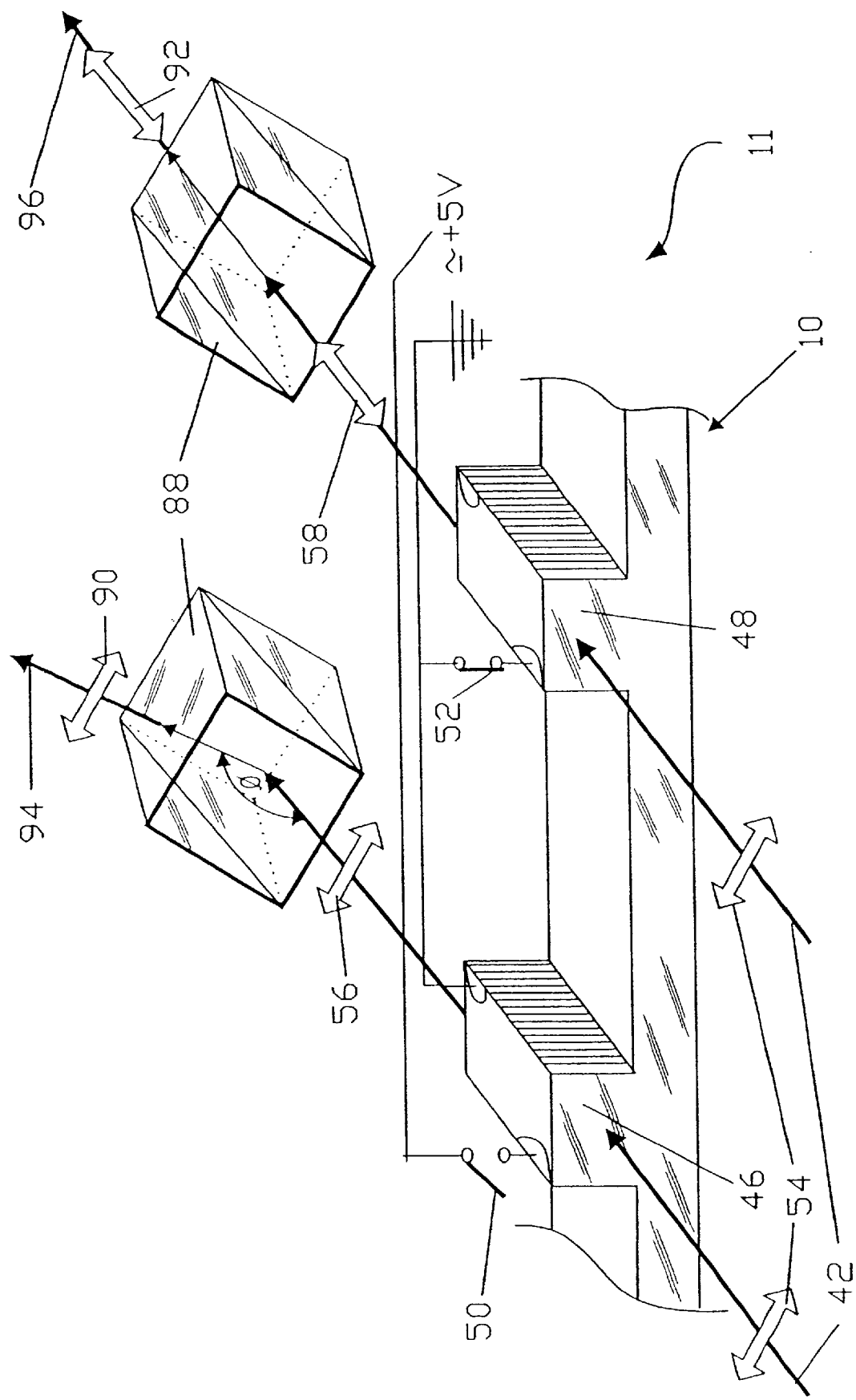
FIG. 8 is a perspective view of system for modulating and switching light beams which uses a modulator array and beamsplitters to separate modulated and unmodulated beams into different channels.

FIG. 8 shows a system 11 for modulating or switching light beams which uses the modulator array 10 in much the same configuration as in FIG. 1. An incoming linearly polarized beam 42 of polarization "R" enters a first element 46 which is inactive due to an open switch 50, so that its exiting polarization 56 is unchanged. This enters a beamsplitter 88 that has been positioned so that light of R polarization will be reflected out of the beamsplitter at angle $\phi$, as shown by reflected beam 90. In a second element 48, which is active, the voltage is assumed to be such as to produce a $\lambda/2$ shift, the polarization is rotated 90 degrees to "S" orientation, and this passes through the beamsplitter 88, as shown by unreflected beam 92. These beams can be used to carry separate digital information, and may be designated "channel 1" 94 and "channel 2" 96. It is to be understood that beamsplitters can be used as a channel separation device with any of the various embodiments illustrated herein.

Figure 9:
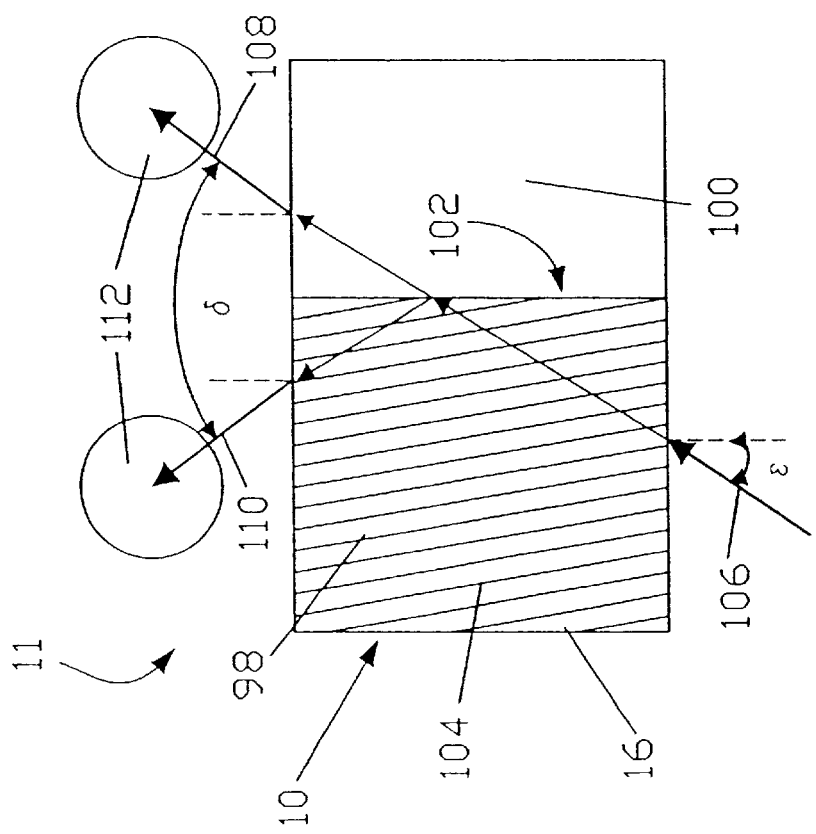
FIG. 9 is a plan view of a system for modulating and switching light beams, which shows a single element of a modulator array used as an alternate mechanism for separating modulated and unmodulated beams into different channels.

FIG. 9 shows a top plan view of another system 11 for modulating or switching light beams which uses a different version of a light modulating array 10. A single protrusion 16 is shown, which is composed of a first block 98 or portion of material having an index of refraction $N_1$, and a second block 100 of material having index of refraction $N_2$. A boundary 102 is formed at the junction of the two materials. One of the two blocks, in this case the first block 98, has top and bottom electrodes 104. First block 98 is composed of electro-optic material such that when electrodes 104 are uncharged, the electro-optic material is inactive, and $N_1=N_2$. When voltage is applied to electrodes 104, the first block 98 becomes active and the index of refraction changes for polarization components which are aligned with the electric field lines so that for this polarization, $N_1 > N_2$. When first block 98 is inactive, an incoming beam 106 is projected into the first block 98 at entry angle $\epsilon$ to a normal such that the beam passes through the boundary between the two blocks 98, 100 and emerges as unreflected light ray 108. When first block 98 is active the index of refraction is increased such that total internal reflectance (TIR) occurs, and the beam is reflected back into the first block 98 at the boundary 102, and emerges as reflected light ray 110. The two emergent beams 108 and 110 are separated by angle $\delta$, which has been greatly exaggerated here. These separated beams 108, 110, can be detected by sensors 112, and thus be used to establish channel separation for data transmission.

Alternatively, the protrusion 16 can be made from a single integral block of material, which has been electro-optically divided into portions or sections. A first section 98 may have electrodes 104 attached to induce a different index of refraction in this section. An incoming beam 106 will then be totally internally reflected, as described above, at the interface between the activated 98 and unactivated sections 100. This interface or boundary 102 can be established more definitely by having the second section 100, be of a different thickness than the first 98. This serves to direct the electric field lines better so that less fringing is produced, and a sharper interface boundary 102 is established.

Figure 10:
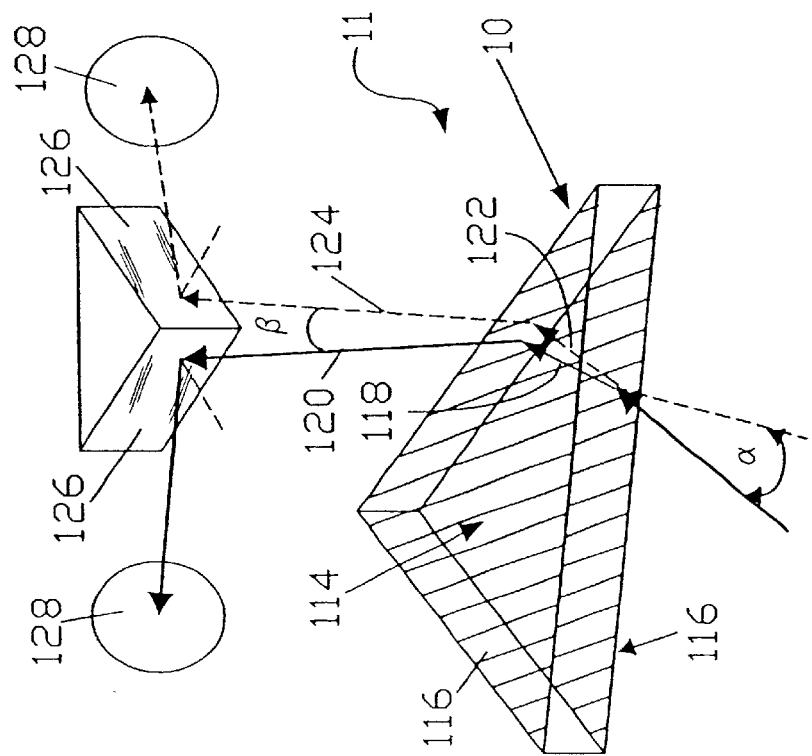
FIG. 10 is a perspective view of a system for modulating and switching light beams which shows a single element of a different version of a modulator array used as an alternate mechanism for separating modulated and unmodulated beams into different channels.

FIG. 10 shows a perspective view of another system 11 for modulating or switching light beams which uses yet another version of the light modulating array 10 to perform channel separation. A single prism-shaped protrusion 114 is shown, which can be electro-optically activated by electrodes 116 to increase the index of refraction. This causes the light beam to be bent towards the normal upon entry slightly differently than when the material is an inactive state. Thus when the element is active, the light beam will follow a first path 118, and will emerge at a slightly different angle relative to the normal upon leaving the element, thus following a first exiting path 120. In contrast, when the element is inactive, the light follows a second path 122 upon entry, and follows a second exiting path 124. Both of these second paths are shown in dashed line in FIG. 10. These first and second exiting paths 120, 124 are separated by angle β, and they can be further directed by mirrored surfaces 126 to sensors 128 to produce separate channels. The separation of the paths and the separation angle has been exaggerated in the FIG. 10.

Figure 11:
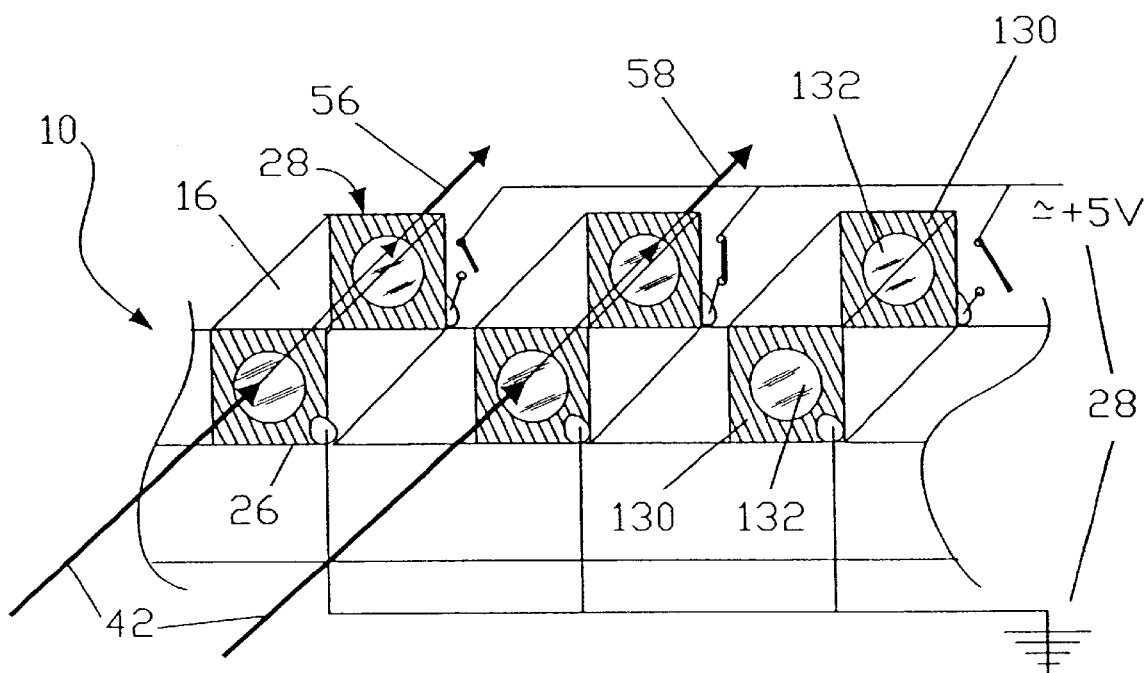
FIG. 11 is a perspective view of a modulator array in which electrodes have been placed so as to produce an electric field which is collinear with the direction of light propagation.

FIG. 11 illustrates yet another version of the present light modulating array 10 in which end-mounted electrodes 130 each having an aperture 132 have been attached to the front faces 26 and rear faces 28 of the protrusions 16. In this configuration, the electric field lines are collinear with the direction of incoming light beams 42. The application of appropriate applied voltage results in the change in polarized output in a manner similar to that discussed above. It is to be understood that the above mentioned methods of splitting the output into separate channels, or using an external polarizer and sensor may be used, as well as mounting of elements on different substrate material, and variations in conductive pad placement.

It is also possible to have a light-producing element, such as a diode laser, with a modulating element physically attached at the laser's output, in order to produce a single integrated element.

Another variation of the preferred embodiment uses sol-gel processing to create an array of elements that are fixed in a flexible medium. Sol-gel processing is a chemically based, relatively low temperature (400–800 degrees C.) method that can produce ceramics and glasses with better purity and homogeneity than higher temperature (2,000 degrees C.) conventional processes.

When using molding processes, two approaches are possible. In the first approach, a non electro-optic, optically transparent or non-transparent matrix is prepared. Electrodes are deposited on the side walls. Then it is filled with soft, curable electro-optic material of sol-gel type or polymer resin. It is then cured to produce an array of electro-optic modulators separated spatially by non electro-optic material.

In the second approach, an electro-optically active matrix of solid or flexible material is prepared. Electrodes are deposited on the side walls. Then it is filled with soft, curable non electro-optic material, of optically transparent or non transparent, sol gel type or polymer resin. Then it is cured to produce an array of electro-optic modulators separated spatially by non electro-optic material.

For the PLZT thin films made by the sol-gel process with 1–2 $\mu$m spacing between embedded adjacent electrodes, $\lambda/2$ voltages range from 20–30 Volts for 0.5 $\mu$m thick films, to TTL levels (4–5 Volts) for 1–2 $\mu$m film thickness. This idea is very attractive for large area flat panel display applications, which function like CRT tubes and which may successfully compete with them. Because electrode spacing is necessarily very small to achieve low driving voltages, resulting pixel size is also very small, which makes this embodiment ideal for high-resolution flat panel displays or spatial light modulators. This fine pixel structure is below typical resolution capability of the human eye, so for consumer applications, sub-micron and micron size substructures may be aggregated to produce standard sized pixels (usually dozens or hundreds of microns). To simplify the manufacturing process and make it compatible with existing flat panel technology, the pixel size can be made larger. In this case, each pixel represents an interdigital pattern of PLZT embedded shutter electrodes.

Figure 12:
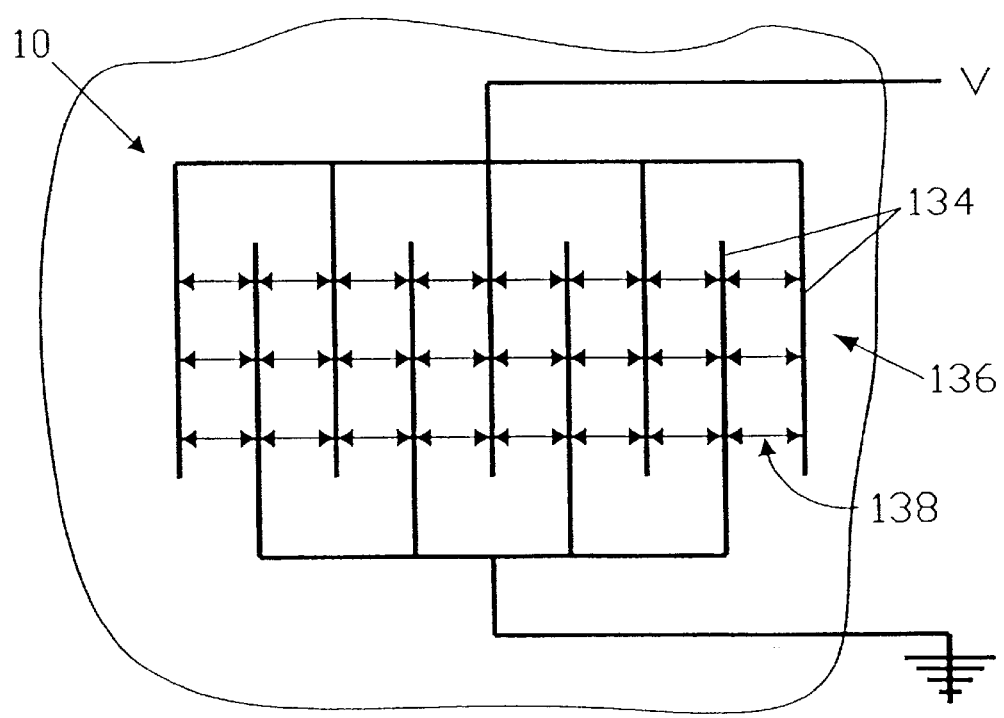
FIG. 12 is a cross-sectional view of an embedded electrode array in a sol-gel matrix of electro-optic material.

FIG. 12 shows a top plan view of a modulator array 10 composed of embedded electrodes 134 that are contained in a sol-gel matrix 136. The arrow lines indicate electric field lines 138. The height of the electrodes 134 (out of drawing plane) is defined by the thickness of the film. In the figure, light also travels perpendicular to the drawing plane. For non-polarized light, the modulator array 10 is placed in between two cross polarizers (not shown).

The electrode structures can be deposited either prior to the sol-gel film deposition, or after it, using standard etching or micro-machining techniques. Using etching techniques and molding processes, the height of the electrodes 134 can be much higher, 10 $\mu$m or more with the same 1–2 $\mu$m spacing between electrodes. In this case, sol-gel can fill the spacings between electrodes 134 and the thin film can still be thin enough (a few microns) to guarantee the same fabrication process and similar process conditions. This will allow driving or switching voltages on the TTL level (4–5 Volts) or below (1–3 Volts and even lower). The arrays thus fabricated can be used in either transmissive or reflective modes. Additionally, the sol-gel material can either be used to completely fill the gap between electrodes, or it can instead be deposited on the sides of the electrodes as a coating. If used as a coating, an additional electrode can be added on the outer side of the sol-gel coating to make a complete element, each element being separated from its neighbor by a gap or groove.

Figure 13:
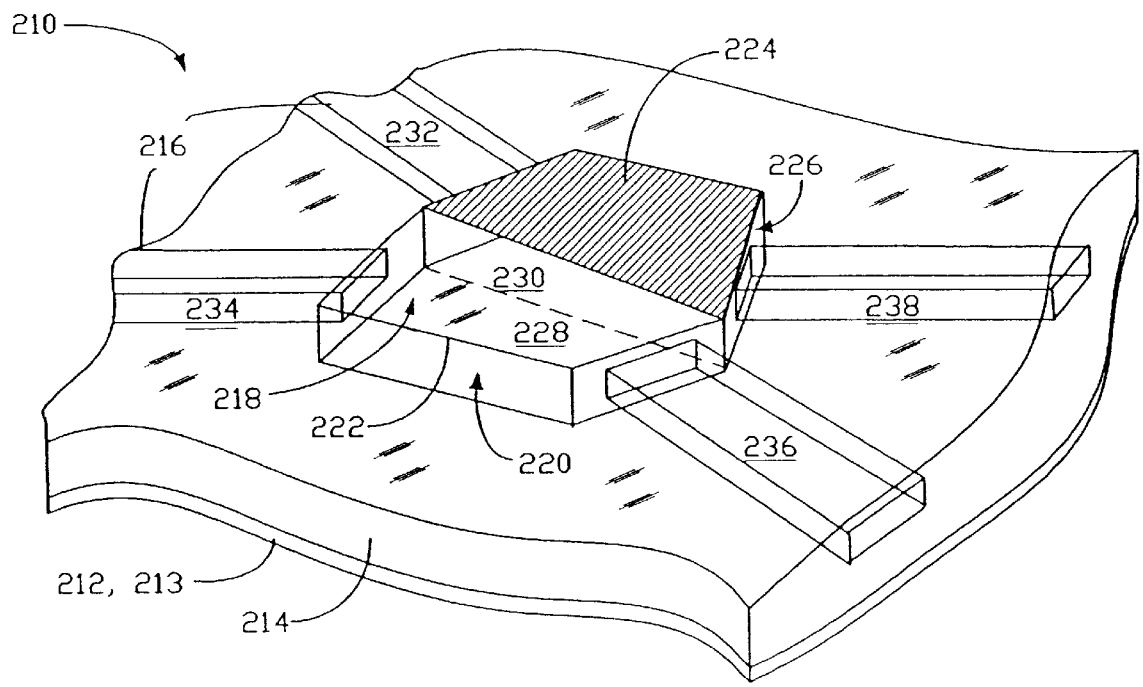
FIG. 13 is a front perspective view of a single optical switch of the present invention.

FIG. 13 shows a preferred embodiment which makes use of several of the inventive features previously disclosed. An optical switch 210 is shown which makes use of total internal reflection at the boundary between an activated portion and an inactive portion of electro-optic material, in the manner of the embodiment previously described and shown in FIG. 9.

The optical switch 210 is fabricated upon a substrate of semi-conductor material 212, which acts as a first electrode 213. Upon this substrate, a matrix of material 214, preferably glass is formed. Light conductive channels 216 are formed in the matrix, and these channels can be formed of either fiber optic material, or preferable are waveguides. The switching element 218 is preferably formed by making a cavity 220 in the matrix material 214, which is then filled with electro-optic material 222. In the preferred embodiment, this electro-optic material is PLZT which is introduced in a sol-gel state, and then cured to a solid. The PLZT sol-gel is used to fill the cavity, and then after hardening, a second electrode 224 is placed on top of a first portion 226 of the electro-optic material 222, leaving a second portion 228 which is not covered by the second electrode 224. The second electrode 224 is connected to a high-speed switching power supply (not shown). At the boundary between the first portion 226 and the second portion 228, there is a potential total internal reflection (TIR) boundary 230. This boundary will act to reflect incident light which approaches from an angle greater than the critical angle for the interface of materials with different indices of refraction. For TIR to occur, the incident light beam must also have polarization which is parallel to the plane of the boundary. In FIG. 13, this would be vertical polarization.

The first material portion 226 and second material portion 228, as discussed above, may be portions of a single unity piece of electro-optic material. It is also possible that the two portions 226, 228 are separate components, perhaps composed of different materials, which have indices of refraction which match closely enough that light will not be reflected at the boundary 230 when the first portion 226 is inactive, but which will be totally reflected internally when the switch 210 is active.

Of the four light conductive channels 216 shown, going counter-clockwise from the upper left hand channel, there is a first incoming signal channel 232 and a second incoming signal channel 234, a first outgoing signal channel 236, and a second outgoing signal channel 238.

Figure 14:
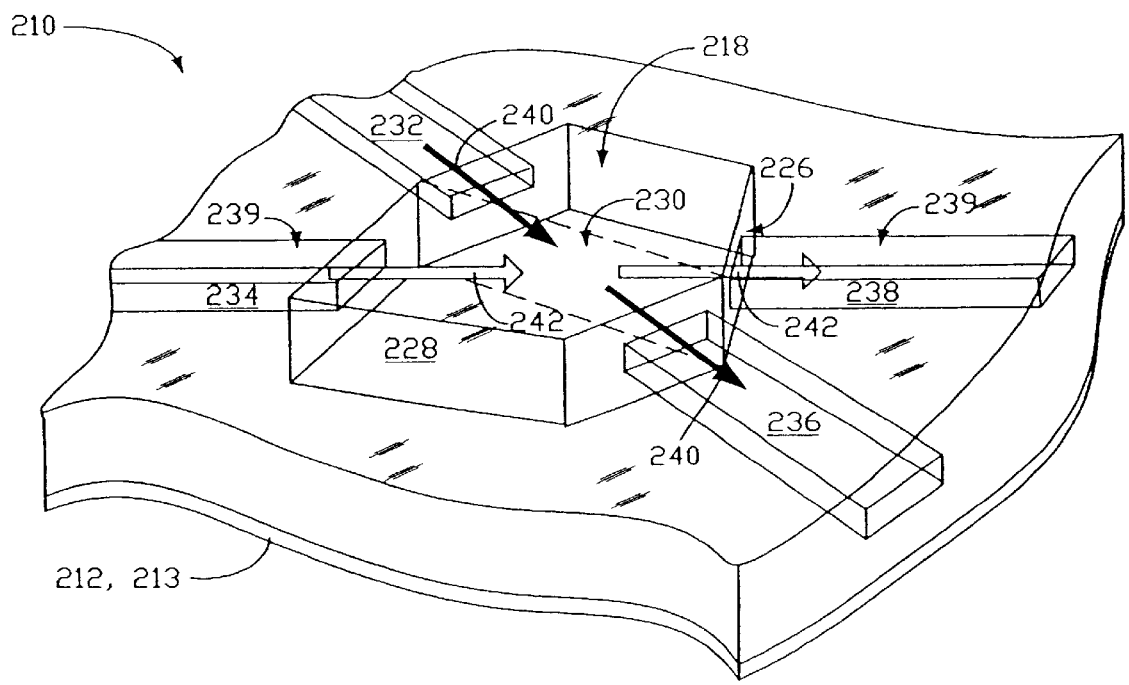
FIG. 14 is a front perspective view of the single optical switch of FIG. 13, from which the upper electrode has been removed for easier viewing, the switch being in an inactive state.

FIG. 14 illustrates an optical switch 210 from which the second electrode 224 has been removed for easier viewing. The optical switch 210 shown is in an inactive state, i.e. no voltage is applied to the electrodes, thus the index of refraction of the first portion 226 of the PLZT and the second portion 228 exactly match. Therefore, the TIR boundary 230 only potentially exists, and is shown in dashed lines in the figure. A first incoming signal 240 is shown as a black arrow which enters the switching element 218 through the first incoming signal channel 232. As the switch 210 is inactive, the first incoming signal 240 continues unaffected and is relayed through the first outgoing signal channel 236. A second incoming signal 242 is depicted as a white arrow which enters from the second incoming signal channel 234, and also continues in a straight line to exit from the second outgoing signal channel 238. Since the second incoming signal is not intended to be modulated by the TIR boundary 230, it is merely relayed onward from this switch 210. The second incoming signal channel 242 together with the second outgoing signal channel 238 can be thought of as a passive crossing channel 239 with respect to the second incoming signal 242. The incorporation of a passive crossing channel 239 is useful in routing of signals in larger arrays of optical switches, as will be described below, but is not necessary to the operation of the individual switch 210 shown in FIG. 14. Its inclusion here is thus not to be construed as a limitation on the structure or operation of the switch 210.

Figure 15:
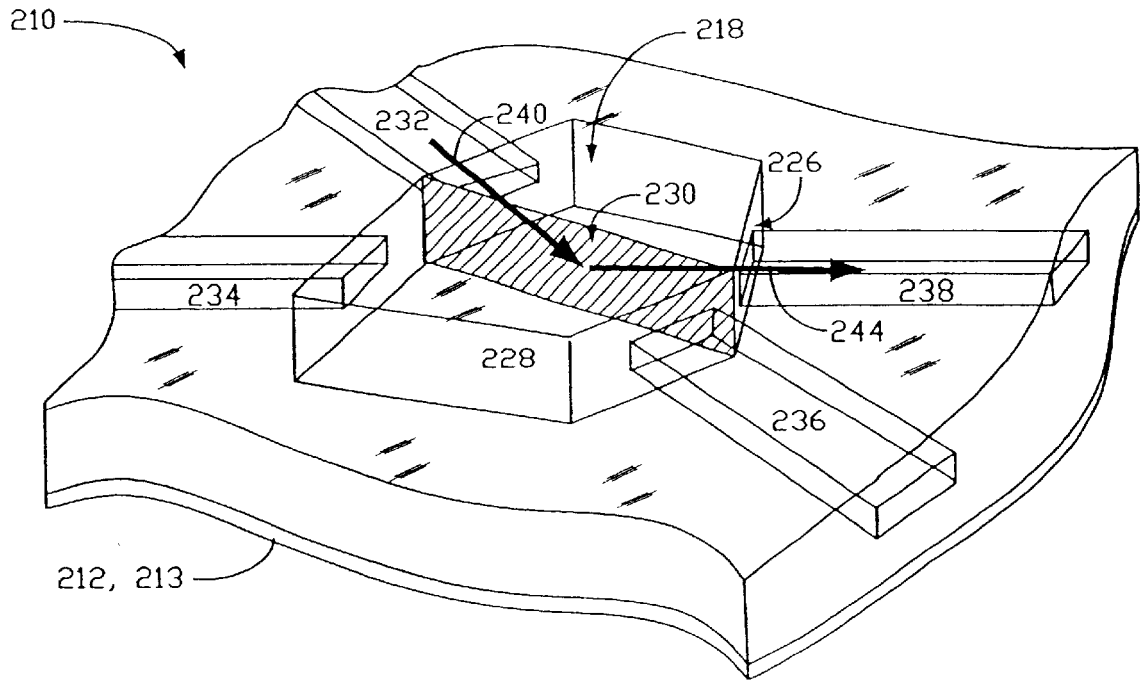
FIG. 15 is a front perspective view of the single optical switch of FIG. 13, from which the upper electrode has been removed for easier viewing, the switch being in an active state.

FIG. 15 illustrates the optical switch 210, again with the top electrode removed, in an active state. Thus, the electrodes, although not shown, are charged and an electric field is generated in the first portion 226 of electro-optic material. The index of refraction is thus increased for this portion, so that total internal reflection is produced for light which approaches at the angle assumed by the first incoming signal 240, again shown as a black arrow. The TIR boundary 230 is established, and the first incoming signal 240 is reflected off the TIR boundary 230 and into the second outgoing signal channel 238 as the reflected beam 244. Thus the first incoming signal can be switched from the first outgoing signal channel 236 whenever the appropriate electric field is generated in the first material portion 226. This switching can be done very quickly, on the order of picoseconds ($10^{-12}$ seconds), and as explained above, standard TTL voltages can be used, which are compatible with many standard power supplies.

Figure 16:
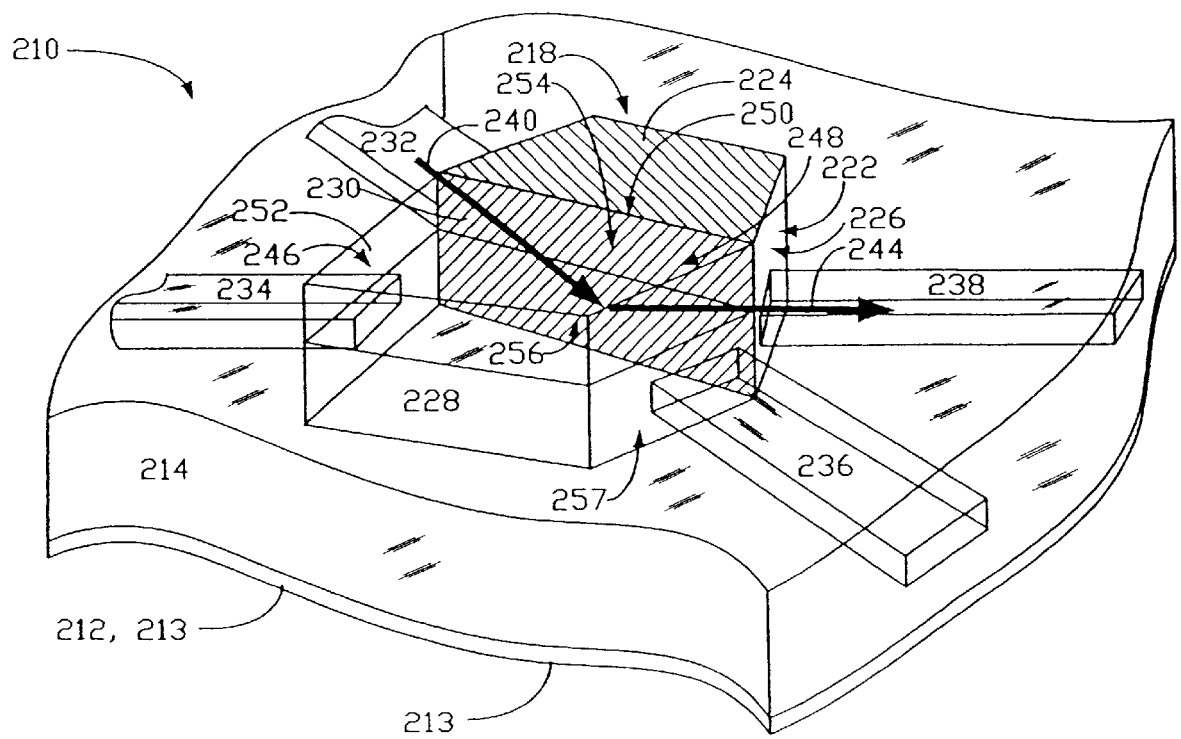
FIG. 16 is a front perspective view of an alternative embodiment of a single optical switch of the present invention which has improved flatness and uniformity of TIR boundary.

The quality of the reflected beam 244 is dependent on the flatness and uniformity of the TIR boundary 230, much the same as that of any reflecting surface. A reflected beam from a very flat surface will naturally tend to retain the properties of the incident beam better than a reflected beam from a less flat and less uniform surface. The properties of the boundary of the electric field produced define the flatness of the TIR boundary. If the electric field lines are diffused and irregular with much fringing, the boundary will also be defused and irregular. Thus it is desirable to confine and direct the electric field lines so that the boundary is as nearly a sharply defined flat plane as possible. FIG. 16 shows a preferred embodiment of the present invention in which the flatness of the TIR boundary is enhanced.

In the embodiment shown in FIG. 16, the thickness of the matrix layer 214, as well as that of the electro-optic material 222 has been increased. It should be understood that the relative thicknesses of the layers shown are for illustration only and are not drawn to scale. The switch 210 shown is in the active state, thus charge is applied to the second electrode 224 and an electric field has been established in the first material portion 226, creating TIR boundary 230. A step region 246 has been removed from the second portion 228 by some shaping process such as etching including reaction ion etching and plasma etching, laser ablation, or use of mechanical processes such as abrasion or cutting, so that the second material portion 228 has a remaining thickness less than the thickness of the first portion 226. A step face 248 is thus established as the vertical surface of the first portion 226 above the second portion 228 of the electro-optic material 222, this step face being created by the removal of second portion 228 material resulting in the step region 246. The front edge 250 of the second electrode 224 is configured to exactly match the profile of the step face 248. In fact, both may be formed simultaneously by first depositing the electrode 224 on the electro-optic material 222, and masking the electrode 224 to the extent of the desired material first portion 226. The step region 246 is then etched or ablated along with the unmasked part of the electrode 224, at the same time.

The step region 246 is then filled with some material having a low dielectric constant (k) and low polarizability (p), which will be referred to as low k low p material 252. The glass material of the matrix 214 is well suited for use as low k low p material 252, as is air, plastic and many kinds of gases or liquids. The electric field lines created when the electrode 224 is charged will not propagate well in this low k low p step region 246, and will form a sharp boundary along the step face 248. This defines the upper portion 254 of the TIR boundary 230 as a flat plane along the step face 248. This flatness and definition are extended to all the electric field lines and thus throughout the lower portion 256 of the TIR boundary 230 which extends through to the substrate 212.

As stated above, the illustration has been drawn without any attempt to depict the relative thicknesses to scale. Representative dimensions are 20 microns for the thickness of the PLZT material in the first material portion 226, a step depth of approximately 7 microns, and thus a thickness of 13 microns for the second material portion 228, assuming that an incident beam is approximately 10 microns in diameter. These dimensions are not to be construed as limiting, and much variation is possible.

It will of course be obvious to one skilled in the art that other variations and embodiments are possible as well. As mentioned above, it is possible that the two portions 226, 228 are separate components, perhaps composed of different materials. The second portion 228 may even be of a non-electro-optic material, in which case, the second electrode 224 need not be limited to only the first portion 226, but may extend over both first and second portions 226, 228. Only the first portion 226 will then change index of refraction, and the boundary 230 will correspond to the physical boundary of the first portion 226 component. The uniformity and quality of reflected image from the TIR boundary 230 will then depend on the smoothness of the boundary wall of the first portion 226, as machined or etched. This type of element may have advantages as to ease of manufacture.

For another example of variation, a curved mask could be applied to provide a curved front edge 250 to the electrode 224 and thus also produce a curved step face 254 and TIR boundary 230. This may have some advantages in focusing or manipulating the reflected beam 244 profile. For example, the reflected beam can therefore be focused in such a way as to insure that the beam will be efficiently coupled into the outgoing waveguide. Thus a separate collimating or focusing element could be eliminated. It is also possible to configure the switch 210 with curved outer boundaries or other geometric shapes besides the hexagonal shape shown as the perimeter of the element 218. Perimeter portions 257, as seen in FIG. 16, may be curved or straight, and by providing both a curved perimeter 257 and a curved TIR boundary 230, it is therefore possible to create a first portion 226 which could be a configured in a convex-convex lens shape, for one example among many. Of course, many other combinations of flat and curved surfaces could be used for the perimeter portion 257 and TIR boundary 230 of the first portion 226, and all are contemplated by the present invention.

The switch may also have only one incoming signal channel and two outgoing signal channels, or more than two incoming and two outgoing signal channels.

Figure 17:
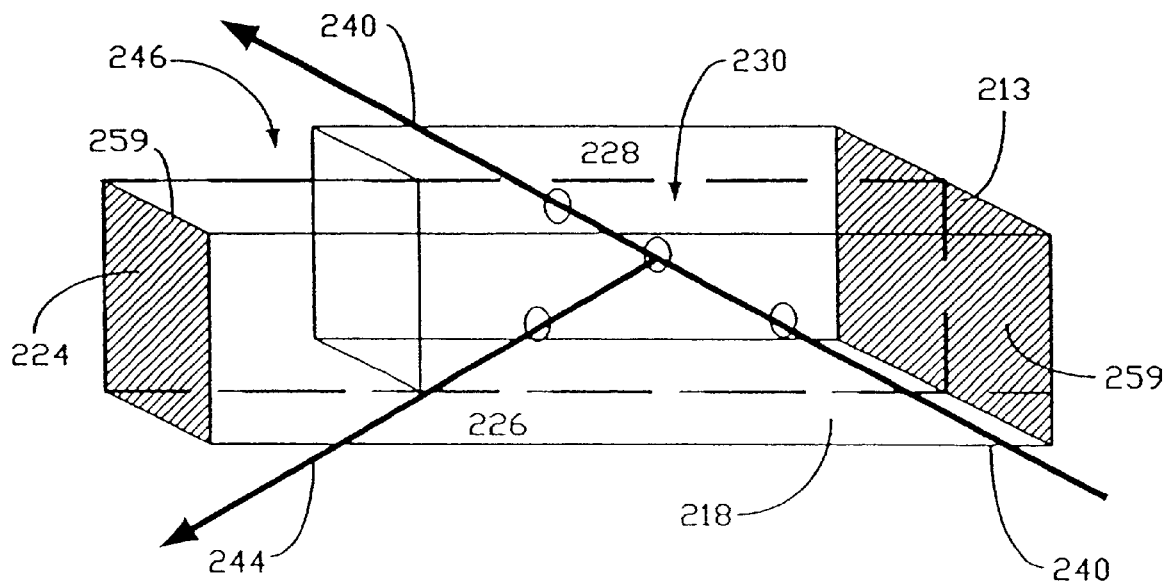
FIG. 17 is a front perspective view of an optical switch having electrodes placed on the side walls of the element.

It is also possible for the electrodes to be placed on side surfaces of the element rather than top and bottom surfaces. Such a configuration is shown in FIG. 17. The switching element 218 includes side walls 259 to which the first electrode 213 and second electrode 224 are attached. As before, the first portion 226 is of lesser thickness than the second portion 228, so that there is a step region 246 formed which serves to direct and confine the TIR boundary 230. An incoming signal beam 240 is shown passing through as if the TIR boundary 230 is inactive, by the black arrow. Also shown is the reflected beam 244, depicted by a gray arrow, which will result if the TIR boundary 230 is activated. The element 218 can be included in a matrix material, which is not shown here, and included in larger arrays, as will be discussed below.

Figure 18:
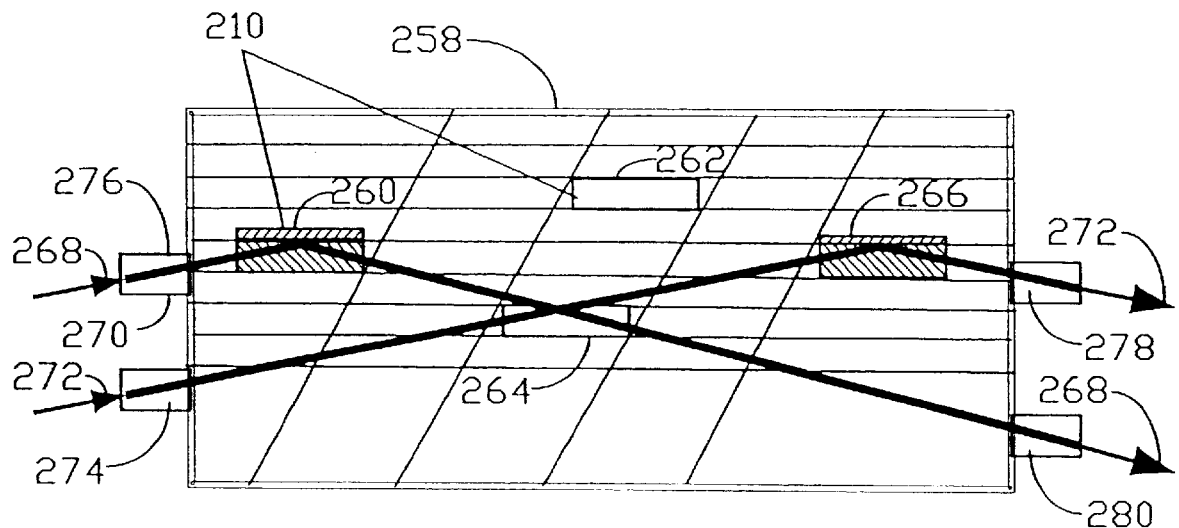
FIG. 18 is a top plan view of an array of optical switches configured as a cross-connect switch in which two upper and lower input signals cross to exit from output channels.
Figure 19:
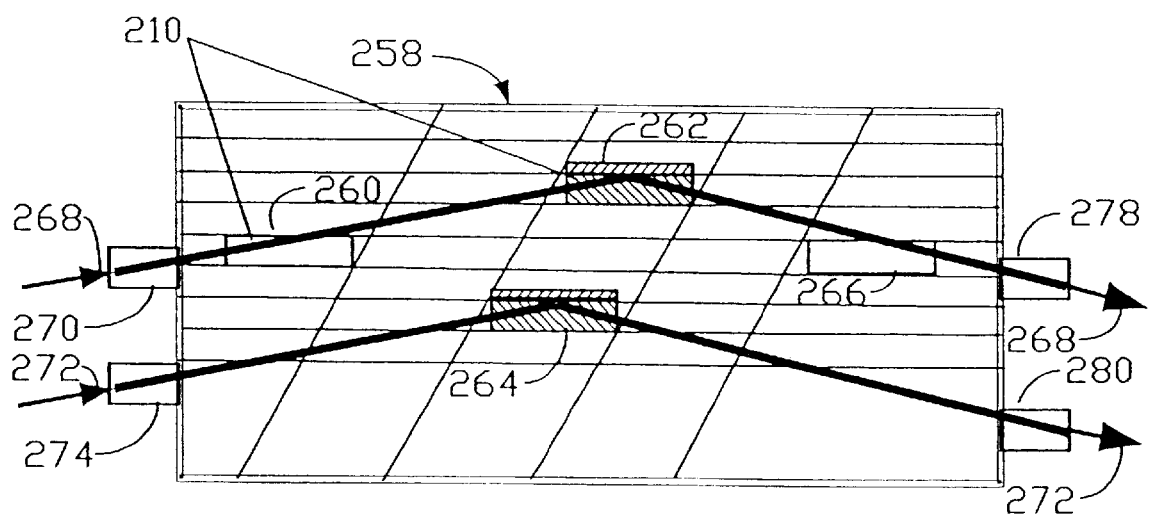
FIG. 19 is a top plan view of an array of optical switches configured as a cross-connect switch in which two upper and lower input signals exit from upper and lower output channels without crossing.

The optical switches 210 are made to be used in arrays and groups to form N×M matrices for switching signals. FIGS. 18 & 19 illustrate a simple 2×2 cross-connect switch 258 using four optical switches, which are designated as first switch 260, second switch 262, third switch 264, and fourth switch 266. A first input signal 268 arrives through the first input channel 270, and a second input signal 272 arrives through the second input channel 274. The incoming signals 268, 272 are each optionally passed through collimators 276 and then enter the cross-connect switch 258. A first output channel 278 and a second output channel 280 are provided at the output of the cross-connect switch 258. All signals may be routed to the cross-connect switch by signal channels, as described above, which may be optical fibers, waveguides or free-space propagation. In FIG. 18, switches 260 and 266 are active, and are represented graphically as active by shading. The switches work as previously described to cause TIR of an incoming beam of the appropriate polarization, assumed vertical, which approaches within an appropriate range of angles. The first input signal 268 is thus reflected by switch 260 and passes through inactive switch 264 to exit through second output channel 280. Second input signal 272 also passes through inactive switch 264 but is reflected by switch 266 to exit through first output channel 280.

FIG. 19 shows the routing of signals when switches 262 and 264 are active, shown by shading. First input signal 268 passes through inactive switch 260, but is reflected by active switch 262 to pass through inactive switch 266 and finally exit through first output channel 278. Similarly, second input signal 272 is reflected by active switch 264 and exits through second output channel 280.

Of course, it will be obvious that other combinations of active and inactive elements exist, for example, where both switches 260 and 262 are inactive so that first input signal 268 will pass in a undeflected straight line to arrive at a possible third output channel, not shown. Similarly, if both switches 264 and 266 are inactive, second input signal 272 will travel undeflected to a possible fourth output channel, also not shown. Thus the cross-connect switch is not limited to an "N×N" switching matrix, where N=2, for instance, but can be designed to a "N×M" matrix, where, for the combinations discussed immediately above, N=2, and M=4. Also obviously, more switches can be added and more input and output channels used to increase the number of possible variations.

The optional collimators 276 discussed above are used to collimate the beam and provide more uniform beam profile within the cross-connect switch 258. Upon exit from the cross-connect switch 258, there may be a focusing lens, not shown, or other optics to manipulate the size or shape of the beam. The beam exiting from a first cross-connect switch can be aligned to enter a second cross-connect switch, a fiber optic, waveguide or other optical device, or may be used to excite pixels on a display screen.

As alluded to above, the incident signal beam must be of polarization which is parallel to the plane of the beam in order to be reflected by an active TIR boundary. This suggests further possibilities and variations, for example, where some components of an incoming beam may have parallel polarization, and thus are switched by a first element, while other components with polarization orthogonal to the first element may pass through unaffected, perhaps to later be switched by a second switch having a TIR boundary at the appropriate orientation to now reflect the signal. It is also possible that larger combinations of switches such as the cross connect switch discussed above could be designed to only act upon light of a certain polarization, letting others pass. Many varieties of signal processing are thus possible. All such variations are contemplated by the present invention.

In addition to the above mentioned examples, various other modifications and alterations of the inventive device 10 may be made without departing from the invention. Accordingly, the above disclosure is not to be considered as limiting and the appended claims are to be interpreted as encompassing the true spirit and the entire scope of the invention.

INDUSTRIAL APPLICABILITY

The present device 10 is well suited for application in a wide range of fields in which light modulators and high speed light switching devices are used, such as in high-speed printing, image processing and telecommunications. The present invention 10 is also especially suited for use in flat panel displays and projection television.

Although the basic array structures 10 discussed above are in a one-dimensional line configuration, these may be configured and arranged to form two-dimensional sheets of large size. Additionally, by use of the sol-gel process, they may be used to make a kind of thin flexible display material almost like cloth, which may be used to cover three dimensional forms or perhaps even to make clothing.

The materials presently used in flat panel displays respond very slowly to changes in display information. This leads to the commonly observed problem, especially in flat panel displays of laptop computers, that the display of a moving object will leave trails behind, due to the lag in the response of the display. The present invention, by contrast, is theoretically capable of switching speeds of 100 GHz and more, producing such fast response that it is beyond the ability of the human eye to register individual steps in a display of motion.

Prior art displays also may exhibit the problem of aliasing, or the jagged edges sometimes seen around the outline of a displayed object due to the comparatively large size of pixels in a digital display. By contrast, the elements of the present invention 10 may be made as smaller than 1 μm×1 μm in cross section, each element being capable of producing an independent signal. Thus each element is potentially an independent pixel. The use of the present invention completely eliminates the problem of aliasing down to the microscopic scale. Indeed, the human eye cannot resolve such small elements. Thus for use on the scale of ordinary unaided human vision, the elements may be grouped into larger pixels, whose overall size can still be small enough to provide far better image resolution than is presently available. There may also be applications in which microscopic pixel size is advantageous, such as making microscopic photo masks for microchip manufacture. The ungrouped pixels of the present invention are uniquely suited for such uses.

The very small size of the elements allows low driving voltages to be used to produce the necessary electric field density to induce the desired electro-optic effect. TTL levels may be used with some materials. The use of TTL level voltages has many significant advantages. TTL level power supplies have been well developed over many years and are commonly available "off the shelf". Thus power supplies can be easily obtained for systems that utilize the present invention 10, without having to provide a customized power supply. This also allows easier introduction of the present invention 10 into equipment that uses TTL devices and already has the appropriate power supply in place.

The present invention 10 also may be designed to utilize sub-TTL levels. It is useful in many applications in which these smaller driver voltages are supplied.

Prior art light modulators and optical switches that are fabricated on a common wafer without benefit of any feature to channel the electric field lines commonly suffer from problems with cross-talk between the channels. This interferes with image clarity and can corrupt transmitted data. By contrast, by utilizing the discrete elements of the present invention 10, cross-talk between channels is practically eliminated, resulting in cleaner image production and improved accuracy and integrity of data transmission. This has very many industrial applications in a wide variety of devices such as printers, telecommunications, and visual displays.

In addition, for telecommunications applications, prior art diode lasers which have been used, have typically suffered from the problem of "chirping" which is interference which can be produced when the voltage supplied to a diode laser is rapidly modulated. In contrast, the present invention 10 modulates the optical output, rather than the diode laser itself. This greatly reduces interference and can eliminate the problem of chirping. This can be an important advantage for telecommunications applications.

Another feature that makes the present invention 10 especially desirable for industrial applications is its ease of manufacture and low cost. It can be made using existing technology by varying methods such as micro-machining, laser ablation, selective etching in an electric field, and molding by conventional means or using a sol-gel process. For micro-machining, the same kinds of micro-saws as are presently used in trimming silicon wafers can be used to form the slots between the projections.

Another method for manufacturing light modulating arrays 10 is the use of sol-gel processing to create an array of elements that are fixed in a flexible medium. Sol-gel processing is a chemically based, relatively low temperature method that can produce ceramics and glasses with better purity and homogeneity than higher temperature conventional processes. Another of the attractive features of the sol-gel process is the capability to produce compositions not possible with conventional methods.

Thin films of PLZT electro-optic ceramic made with the sol-gel process have a number of advantages relative to PLZT ceramics prepared from powders. Large surface areas of thin film can be created which have very uniform (homogeneous) material structure. Small grain sizes are achievable, in the range of 10's of nm, with much less porosity compared with PLZT ceramics prepared from powders. A wide range of film thickness from a few nanometers to a few microns can be produced.

Sol-gel manufacture also easily lends itself to high volume production. It is inexpensive, suitable for large area spatial light modulators or flat panel displays and can utilize micro-machining fabrication processes which are standard in the industry. It can be used for bright, ultra high-speed flat panel displays or spatial light modulators suitable for computer interconnects and high-speed tele-communications with very wide viewing angles which may eventually be used to replace cathode ray tubes.

A light modulating switch 210 as described above creates a total internal reflection (TIR) boundary 230 within an electro-optic element 218 by providing an electric field in only a first portion 226 of the electro-optic element. This produces a change in the index of refraction of the material in the first portion 226 so that it is now greater than the index of refraction of the non-activated second portion 228. Incident light 240 which approaches at an angle greater than that of the critical angle for the two indices of the two portions, and which is of proper polarization orientation, will be reflected into a second path, thus modulating the optical output of the switch 210. The switch can also be operated at TTL levels and pico-second range switching times.

The operation of the switch is enhanced when the electric field lines within the active first portion 226 are narrowly directed, and with minimum fringe effects. In order to decrease fringing, a preferred embodiment of the present invention uses an element 218 which has a step region 246 removed from the second portion 228, leaving the first portion 226 to be of a greater thickness than the second 228. The step portion is filled with material with a low dielectric constant and low polarizability which can be air, glass or plastic. The electric field is thus provided with a sharp boundary at the upper portion 254 of the TIR boundary 230, and this sharp boundary carries into the lower portion 256 of the TIR boundary 230. This causes the TIR boundary 230 to be very flat and sharply defined with very little fringing at the TIR boundary portion at which the incident beam 240 is reflected. The reflected beam 244 thus suffers very little distortion and maintains excellent beam quality throughout modulation or switching.

As alluded to above, TIR will occur only for light of polarization orientation which is parallel to the plane of the TIR boundary 230. Light of different polarizations can thus be separated into components by an active TIR boundary, and this allows additional modes of modulation and signal processing that are not available with traditional electrical signals.

The optical switch 210 can be easily combined in arrays and N×M cross-connect switches 258. They will find many uses in optical imaging and telecommunications, especially since they are easy to manufacture and operate.

For the above, and other reasons, it is expected that the device 10 of the present invention will have widespread industrial applicability. Therefore, it is expected that the commercial utility of the present invention will be extensive and long lasting.

What is claimed is:

1. An optical switching array comprising:

a plurality of optical switches in a planar array, at least one of said switches comprising a first non-waveguide section having an index of refraction and comprising electro-optic material, a second non-waveguide section having an index of refraction, said first and second sections being juxtaposed to form a switchably reflective boundary therebetween, and a pair of spaced electrodes generally parallel to each other and generally orthogonal to the plane of the planar array, said electrodes having respective surfaces associated with opposite sides of said first non-waveguide section to induce an electric field therein and change said refractive index; and optical waveguides extending laterally from said optical switches providing optical connection therebetween, wherein said plurality of optical switches are laterally disposed across a substrate, and wherein a light beam entering said at least one optical switch (i) is reflected from said switchably reflective boundary when said switch is in a first state and the refractive index of the first section has a first value, and (ii) is transmitted through said switchably reflective boundary when said switch is in a second state and said index of the first section has a second value different than the first value.

2. The optical switching array of claim 1, wherein said electrodes are formed on sidewalls of said first portion.

3. The optical switch of claim 1, wherein said first and second sections are juxtaposed such that said switchably reflective boundary is substantially perpendicular to said electrode surfaces.

4. The optical switching array of claim 1, wherein either (i) said second section comprises a material different in composition than said electro-optic material in said first section, or (ii) said second section has a different thickness than said first section.

5. The optical switch of claim 4, wherein said second section comprises a material different in composition than said electro-optic material in said first section.

6. The optical switch of claim 4, wherein said second section has a different thickness than said first section.

7. The optical switch of claim 6, wherein said second section has a reduced thickness compared to said first section.

8. The optical switch of claim 1, wherein said electro-optic material comprises lead zirconate titanate doped with lanthanum (PLZT).

9. An optical switching array comprising:

a plurality of optical switches in a planar array, at least one of said switches comprising a first non-waveguide section having an index of refraction and comprising electro-optic material, a second non-waveguide section having an index of refraction, said first and second sections being juxtaposed to form a switchably reflective boundary therebetween, and a pair of spaced electrodes generally parallel to each other and generally orthogonal to the plane of the planar array, said electrodes having respective surfaces associated with opposite sides of said first non-waveguide section to induce an electric field therein and change said refractive index;

wherein a light beam entering said at least one optical switch (i) is reflected from said switchably reflective boundary when said switch is in a first state and the refractive index of the first section has a first value, and (ii) is transmitted through said switchably reflective boundary when said switch is in a second state and said index of the first section has a second value different than the first value, and said at least one of said switches has an input for receiving a light beam having first and second orthogonal polarizations and said first and second sections and electrodes are configured to switch the first polarization state and permit a second orthogonal polarization state to pass without being switched, and another of said switches has in input for receiving said light beam and has first and second sections and electrodes configured to switch said second orthogonal polarization state.

10. The optical switching array of claim 9, wherein said plurality of optical switches are laterally disposed across a substrate.

11. The optical switching array of claim 10, further comprising optical waveguides extending laterally from said optical switches providing optical connection therebetween.

12. The optical switching array of claim 9, wherein said electrodes are formed on sidewalls of said first portion.

13. The optical switch of claim 9, wherein said first and second sections are juxtaposed such that said switchably reflective boundary is substantially perpendicular to said electrode surfaces.

14. The optical switching array of claim 9, wherein either (i) said second section comprises a material different in composition than said electro-optic material in said first section, or (ii) said second section has a different thickness than said first section.

15. The optical switch of claim 14, wherein said second section comprises a material different in composition than said electro-optic material in said first section.

16. The optical switch of claim 14, wherein said second section has a different thickness than said first section.

17. The optical switch of claim 16, wherein said second section has a reduced thickness compared to said first section.

18. The optical switch of claim 9, wherein said electro-optic material comprises lead zirconate titanate doped with lanthanum (PLZT).

* * * * *